US011280965B2

(12) United States Patent
Beaudoin et al.

(10) Patent No.: US 11,280,965 B2
(45) Date of Patent: Mar. 22, 2022

(54) MULTI-CLAD OPTICAL FIBER WITH TAPER PORTION, AND OPTICAL FIBER DEVICE HAVING SAME

(71) Applicant: POLYVALOR, LIMITED PARTNERSHIP, Montréal (CA)

(72) Inventors: Simon Bolduc Beaudoin, Sherbrooke (CA); Nicolas Godbout, Outremont (CA)

(73) Assignee: POLYVALOR, LIMITED PARTNERSHIP, Montréal (CA)

( * ) Notice: Subject to any disclaimer, the term of this patent is extended or adjusted under 35 U.S.C. 154(b) by 0 days.

(21) Appl. No.: 16/965,630

(22) PCT Filed: Jan. 30, 2019

(86) PCT No.: PCT/CA2019/050114
§ 371 (c)(1),
(2) Date: Jul. 29, 2020

(87) PCT Pub. No.: WO2019/148276
PCT Pub. Date: Aug. 8, 2019

(65) Prior Publication Data

US 2021/0018689 A1 Jan. 21, 2021

Related U.S. Application Data

(60) Provisional application No. 62/623,816, filed on Jan. 30, 2018.

(51) Int. Cl.
*G02B 6/28* (2006.01)
*G02B 6/036* (2006.01)
*G02B 6/26* (2006.01)

(52) U.S. Cl.
CPC ....... *G02B 6/2821* (2013.01); *G02B 6/03633* (2013.01); *G02B 6/262* (2013.01)

(58) Field of Classification Search
None
See application file for complete search history.

(56) References Cited

U.S. PATENT DOCUMENTS 4,877,300 A * 10/1989 Newhouse ............ G02B 6/262 385/43
8,792,757 B2 * 7/2014 Boudoux ............ G02B 6/2821 385/43

(Continued)

OTHER PUBLICATIONS

Yerolatsitis, S., I. Gris-Sánchez, and T. A. Birks. "Adiabatically-tapered fiber mode multiplexers." Optics express 22.1 (2014): 608-617.

(Continued)

*Primary Examiner* — Rhonda S Peace
(74) *Attorney, Agent, or Firm* — Norton Rose Fulbright Canada LLP

(57) ABSTRACT

There is described a multi-clad optical fiber for propagating an optical signal having at least a single mode. The multi-clad optical fiber generally has a fiber core, an inner cladding surrounding the fiber core, and at least an outer cladding surrounding the inner cladding, the multi-clad optical fiber having at least a taper portion extending along a longitudinal dimension z, the taper portion having a radial dimension progressively decreasing at a normalized slope exceeding an adiabaticity criterion of a conventional single-clad optical fiber propagating at least the single-mode across its single-mode core.

20 Claims, 16 Drawing Sheets

(56) References Cited

U.S. PATENT DOCUMENTS

| | | | | |
|---|---|---|---|---|
| 9,753,222 | B2 * | 9/2017 | Godbout .............. | G02B 6/2835 |
| 2011/0226940 | A1 * | 9/2011 | Yun ...................... | G02B 6/2835<br>250/227.11 |
| 2021/0018689 | A1 * | 1/2021 | Beaudoin ............. | G02B 6/2821 |

OTHER PUBLICATIONS

Eugui, Pablo, et al. "Beyond backscattering: optical neuroimaging by BRAD." Biomedical optics express 9.6 (2018): 2476-2494.
Harrington, Kerrianne, et al. "Endlessly adiabatic fiber with a logarithmic refractive index distribution." Optica 4.12 (2017): 1526-1533.
Leon-Saval, Sergio G., et al. "Mode-selective photonic lanterns for space-division multiplexing." Optics express 22.1 (2014): 1036-1044.
De Montigny, Etienne, et al. "Double-clad fiber coupler for partially coherent detection." Optics express 23.7 (2015): 9040-9051.
Lemire-Renaud, Simon, et al. "Double-clad fiber coupler for endoscopy." Optics express 18.10 (2010): 9755-9764.
Ravets, S., et al. "Intermodal Energy Transfer in a Tapered Optical Fiber: Optimizing Transmission." arXiv preprint arXiv: 1310.7228 (2013).
Azari, Amin, Alireza Bananej, and Aydin Ashrafi Belgabad. "Theoretical analysis of optimum adiabatic tapering length and pulse shape modulation along tapered multimode fiber." Optik 127.14 (2016): 5663-5669.

* cited by examiner

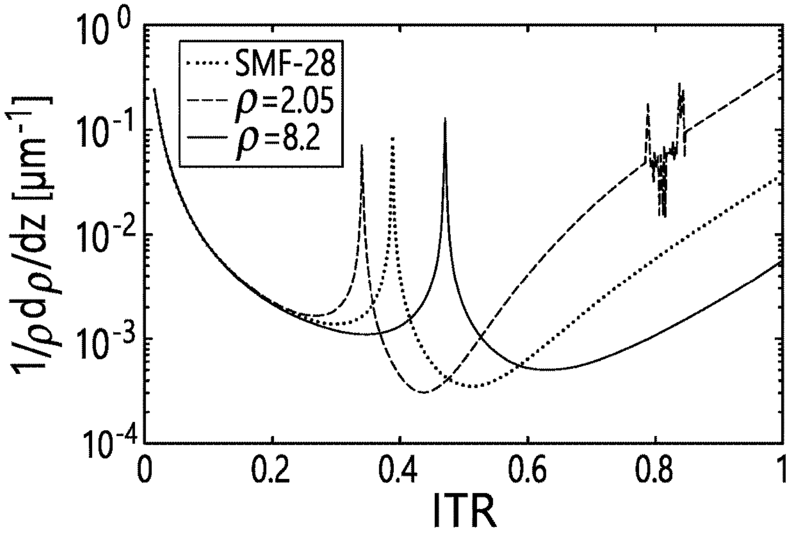
FIG. 10A
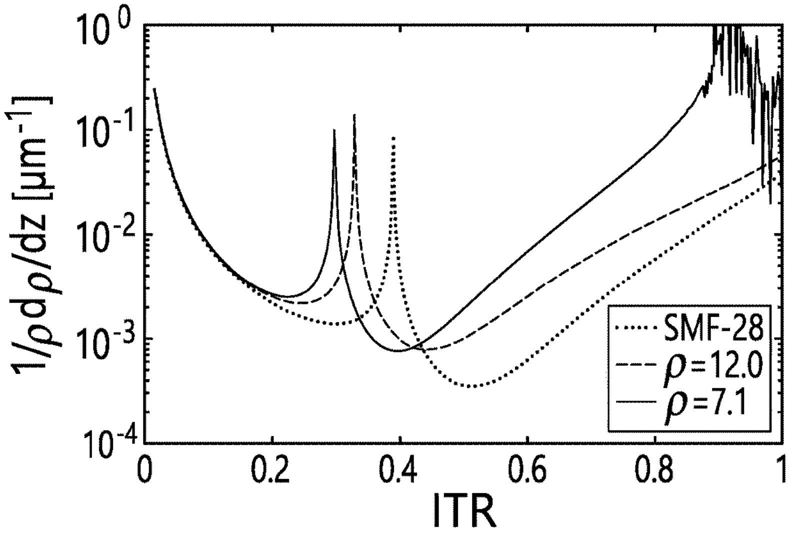
FIG. 10B
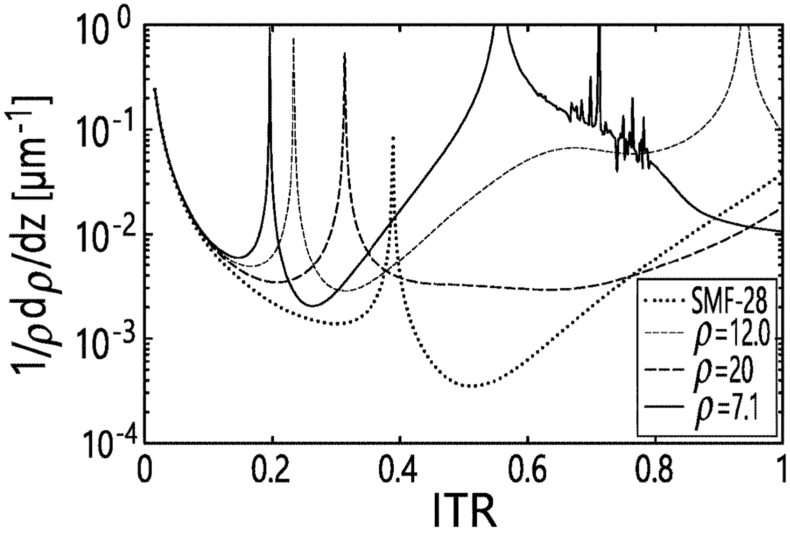
FIG. 10C
| | | $ITR_{c_1}$ | $ITR_{c_2}$ | Min $mm^{-1}$ |
|---|---|---|---|---|
| 1 Step | SMF-28 | 0.41 | - | 0.35 |
| $V_1 = 2$ | $\rho_1 = 2$ | 0.36 | - | 0.31 |
| | $\rho_1 = 8$ | 0.46 | - | 0.50 |
| 2 Steps | $\rho_2 = 7$ | 0.59 | 0.31 | 0.75 |
| $V_2 = 2$ | $\rho_2 = 12$ | 0.50 | 0.32 | 0.78 |
| 2 Steps | $\rho_2 = 7$ | 0.66 | 0.20 | 2.8 |
| $V_2 = 4$ | $\rho_2 = 12$ | 0.54 | 0.22 | 2.8 |
| | $\rho_2 = 20$ | 0.47 | 0.24 | 2.9 |
FIG. 10D

MULTI-CLAD OPTICAL FIBER WITH TAPER PORTION, AND OPTICAL FIBER DEVICE HAVING SAME

FIELD

The improvements generally relate to optical fibers for propagating single-mode or few-mode optical signals and more particularly relate to multi-clad optical fibers for propagating same.

BACKGROUND

Optical fiber devices such as couplers and probes generally incorporate optical fibers tapers. FIG. 1 shows an example of an optical fiber device having an optical fiber with a fiber core and a single-cladding surrounding the fiber core, hereinafter referred to as "single-clad optical fiber". As shown, the optical fiber has a first taper portion extending along a longitudinal dimension between first and second longitudinal locations of the optical fiber. Typically, the taper portion has a radial dimension which progressively decreases at a given slope between the first and second longitudinal locations.

In designing a single-clad optical fiber device, there is a constant compromise between the slope at which the radial dimension of the single-clad optical fiber decreases and the adiabaticity of the optical signal propagating therein. Non-adiabaticity of the signal may lead to losses resulting from an optical coupling between the fiber core modes and higher-order modes. Non-adiabaticity may often times also lead to undesirable optical coupling between the fiber core modes of the optical signal itself. As it is generally preferred to have shorter taper portions to reduce the overall length of the single-clad optical fiber device, shorter tapered transitions necessitate stronger slopes which may lead to non-adiabaticity of the signal of interest.

A generally accepted compromise in the field is to limit the slope of the taper portion to a theoretical limit, referred to as the "adiabaticity power criterion", beyond which the coupling between the optical signal of interest and higher-order modes (e.g., other core modes, cladding modes, radiating modes) begins to appear. Although existing optical fiber devices are satisfactory to a certain degree, there remains room for improvement.

SUMMARY

Standard single-clad optical fibers are satisfactory in at least some situations as they enable fabrication of some single-clad optical fiber devices with tapers including fused optical fiber couplers. However, it was found that many single-clad optical fiber devices are impractical, and even impossible, as they would necessitate very long tapered transitions for their signal to undergo an adiabatic transition.

In an aspect, it was found that the single-clad optical fiber of such optical fiber devices could be replaced by a multi-clad optical fiber having a shorter taper portion without necessarily exceeding the adiabaticity criterion, as the requirements on the adiabaticity criterion are relaxed by the presence of inner and outer claddings of the multi-cladding optical fiber. Accordingly, shorter optical fiber devices can be obtained with no or almost no impact on the optical losses of the resulting optical fiber device.

In accordance with an aspect, there is provided a multi-clad optical fiber for propagating an optical signal having at least a single mode, the multi-clad optical fiber comprising a fiber core, an inner cladding surrounding the fiber core, and at least an outer cladding surrounding the inner cladding, the multi-clad optical fiber having at least a taper portion extending along a longitudinal dimension z, the taper portion having a radial dimension progressively decreasing at a normalized slope exceeding an adiabaticity criterion of a conventional single-clad optical fiber propagating at least the single-mode across its single-mode core.

In accordance with another aspect, there is provided an optical fiber device comprising a first multi-clad optical fiber having a first fiber core, a first inner cladding surrounding the first fiber core, and at least a first outer cladding surrounding the first inner cladding, the first multi-clad optical fiber having at least a first taper portion extending along a longitudinal dimension z, the first taper portion having a radial dimension progressively decreasing at a first normalized slope exceeding a first adiabaticity criterion of a first conventional single-clad optical fiber propagating at least the single-mode across its single-mode core, at least a second optical fiber; and a coupling region having at least a portion of the first taper portion of the first multi-clad optical fiber optically coupled to at least a portion of the second optical fiber.

Many further features and combinations thereof concerning the present improvements will appear to those skilled in the art following a reading of the instant disclosure.

DESCRIPTION OF THE FIGURES

In the figures,

FIG. 9 is a schematic view of another example of a multi-clad optical fiber having a taper portion, with longitudinally spaced-apart refractive index profiles at four longitudinal locations along the multi-clad optical fiber, in accordance with an embodiment;

FIG. 10A is a graph showing normalized slope versus ITR for a conventional single-clad optical fiber (SMF-28) and corresponding taper portions;

FIGS. 10B and 10C are graphs showing normalized slope versus ITR for different multi-clad optical fibers and corresponding taper portions;

FIG. 10D is a table showing parameters of the optical fiber used in the computations of FIGS. 10A-C;

DETAILED DESCRIPTION

Figure 2:
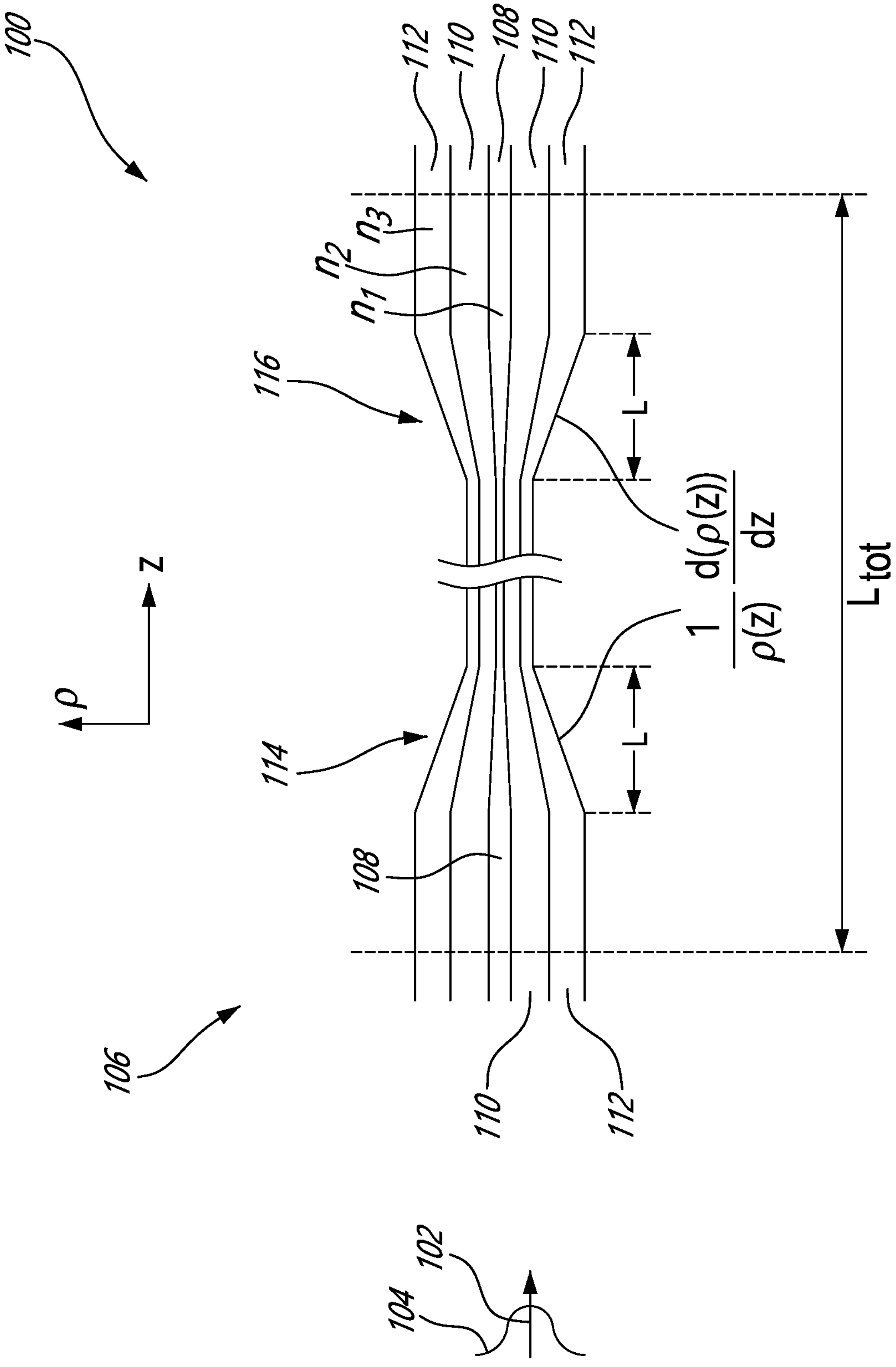
FIG. 2 is a schematic view of an example of a double-clad optical fiber device having a double-clad optical fiber with two longitudinally spaced-apart taper portions, in accordance with an embodiment.

FIG. 2 shows an example of a double-clad optical fiber device 100 for propagating an optical signal 102 having at least a single mode 104. For instance, the optical signal 102 can have a single mode per polarization or a few modes per polarization.

As shown, the double-clad optical fiber device 100 has a multi-clad optical fiber 106 with a fiber core 108, an inner cladding 110 surrounding the fiber core 108, and an outer cladding 112 surrounding the inner cladding 110.

Figure 1:
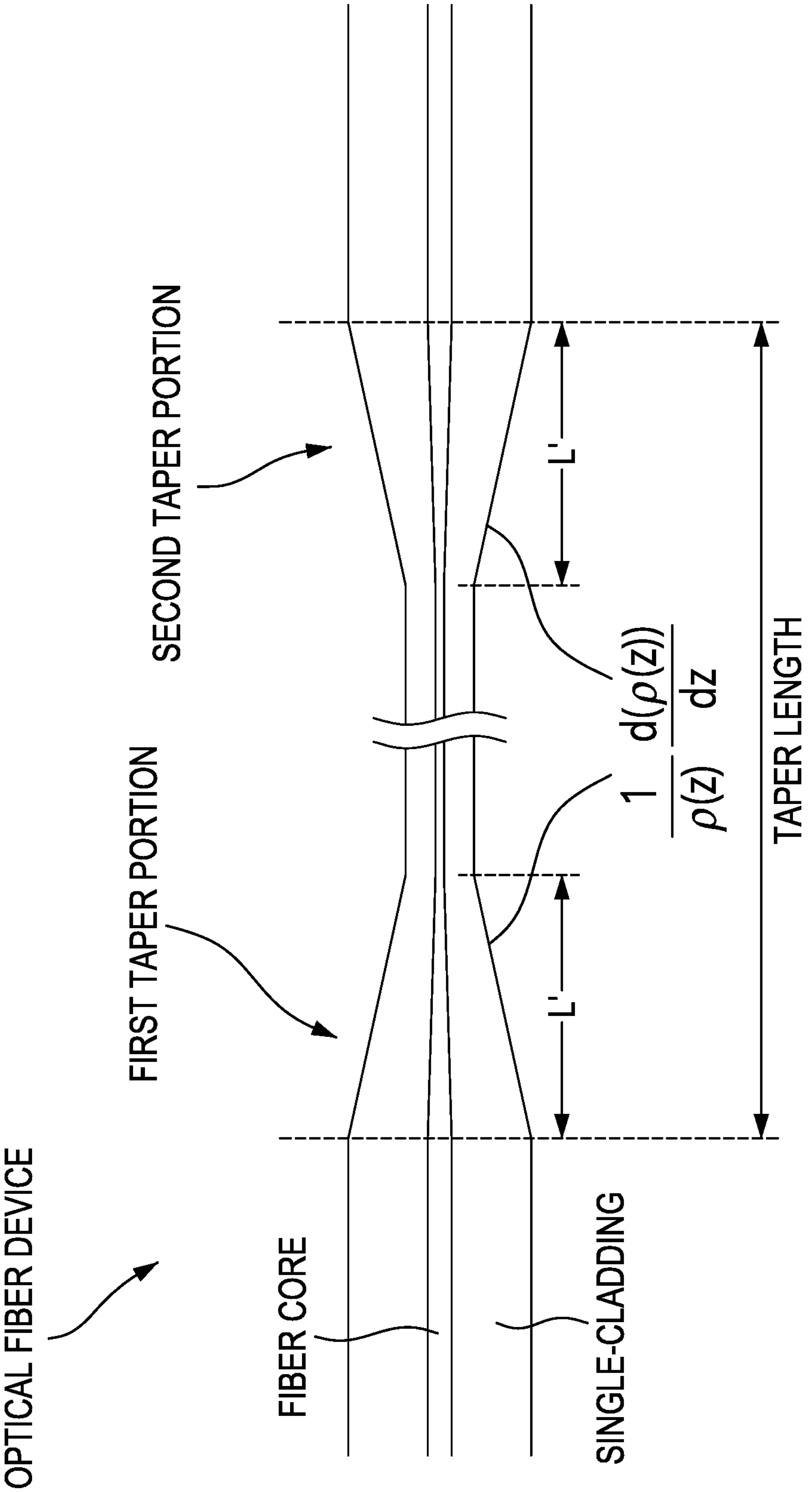
FIG. 1 is a schematic view of an example of an optical fiber device having a single-clad optical fiber with two longitudinally spaced-apart taper portions, in accordance with prior art.

As shown, the double-clad optical fiber 106 has first and second taper portions 114 and 116 extending along a longitudinal dimension z and being longitudinally spaced-apart from one another. In this example, both the first and second taper portions 114 and 116 have a radial dimension ρ progressively decreasing (or increasing depending on which longitudinal direction is taken for reference) at a normalized slope exceeding an adiabaticity criterion of the conventional single-clad optical fiber propagating at least the single-mode 104 across its single-mode core (see FIG. 1).

Typically, before the double-clad optical fiber 106 is reduced, the optical signal is propagated using the guided modes (one or many) of the fiber core 108. During the tapered transition the guided modes of the fiber core 108 are going to gradually transform into cladding modes (as the diameter of the double-clad optical fiber 106 is reduced) and then gradually transform back into core modes as the multi-clad optical fiber 106 returns to its initial radius.

In this disclosure, the normalized slope is defined as $$\frac{1}{\rho(z)}\frac{d(\rho(z))}{dz},$$

where ρ(z) denotes a radial dimension of the fibre core 108 as function of the longitudinal dimension z, and $$\frac{d()}{dz}$$

denotes a variation of quantity ( ) with respect to the longitudinal dimension z. However, the normalized slope can have any other equivalent definitions.

The adiabaticity criterion has been discussed in the field. For instance, Chapter 6 entitled "Optical fiber components: Design and applications of fused biconical tapered components" of text book "Hamam, Habib, ed. *Optical Fiber Components: Design and Aplications*. (2006)" discuss the adiabaticity criterion of conventional single-clad optical fibers in great length, the content of which is hereby incorporated by reference. This subject is also discussed in Birks, Timothy A., and Youwei W. Li. "*The shape of fiber tapers*." Journal of Lightwave Technology 10.4 (1992): 432-438, the content of which is hereby incorporated by reference.

Figure 3:
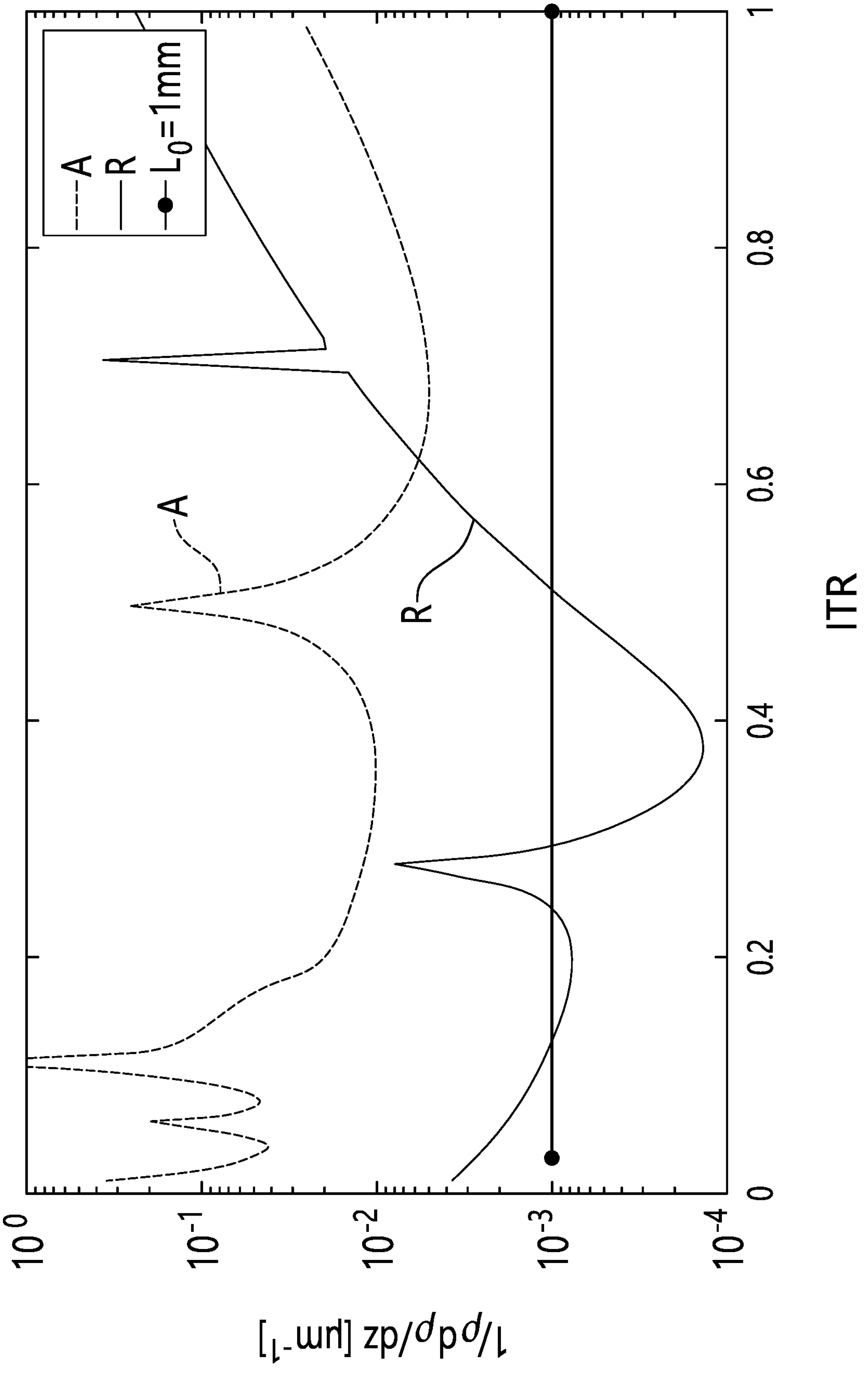
FIG. 3 is a graph showing adiabaticity criterion as function of inverse taper ratio (ITR) for the single-clad optical fiber of FIG. 1 and for the double-clad optical fiber of FIG. 2, in accordance with an embodiment.

FIG. 3 is a graph showing the normalized slope as function of the ITR, which is generally defined as $$\sqrt{\frac{S}{S_0}},$$

where S is the area of the local cross section of the first taper portion 114, whereas $S_0$ is the area of the local cross section of the multi-clad optical fiber 106 prior to tapering. Curve $L_0$ shows the normalized slope of the first and second taper portions 114 and 116. It represents a simple fabrication trajectory that is adiabatic for the signal propagating in the double-clad optical fiber 106 and non-adiabatic for the single-clad optical fiber. Calculation of the curves shown in FIG. 3 are based on a wavelength of 730 nm and the signal of interest is the $LP_{01}$ mode guided by the core of each mentioned optical fibers.

In this graph, reference adiabaticity criterion curve R corresponds to an adiabaticity criterion curve showing potential power transfer between the first two modes, i.e., the fundamental mode LP01 and the first higher-mode LP11, propagating along the taper portions of the single-clad optical fiber. Typically, when designing the optical fiber device of FIG. 1, the normalized slope of the taper portions is chosen so that it remains below the reference adiabaticity criterion curve R for all ITRs, in order to achieve adiabaticity (no optical losses) and the shorter optical fiber device as possible. Other adiabaticity criterion curve can be computed for other pairs of mode, e.g., between the LP01-LP1*m* modes, however, the adiabaticity criterion curve associated to the first two modes (i.e., when m=1) is generally the more restrictive criterion.

However, the inventors found that by using the double-clad optical fiber 106, or any other suitable multi-clad optical fiber, instead of the single-clad optical fiber, a resulting adiabaticity criterion curve, such as curve A, would be raised by a significant amount relative to the reference adiabaticity criterion curve R of conventional single-clad optical fibers, which in turns allows the normalized slope to be raised accordingly. In other words, when using such double-clad optical fibers, the normalized slope of the taper portions 114 and 116 can be increased, which consequently reduces a length L of the taper portions and an overall length $L_{tot}$ of the double-clad optical fiber device 100. As shown, the curve $L_0$, associated to the portion of minimal diameter of the multi-clad optical fiber device 100 of FIG. 2, is above the reference adiabaticity criterion curve R but below the curve A for all ITRs. The multi-clad optical fiber device 100 is thus an adiabatic optical fiber device. It will be appreciated that the length $L_{tot}$ of the central portion of constant diameter of the multi-clad optical fiber device 100 is about 1 mm in this example. To do a similar optical fiber device with conventional single-clad optical fiber, its length would have rather been of at least about 10 mm, and thus significantly longer than the length $L_{tot}$ of the multi-clad optical fiber device 100.

Moreover, in some embodiments, the normalized slope of the taper portions 114 and 116 of the multi-clad optical fiber 106 can exceed the adiabaticity criterion of the conventional single-clad optical fibers, but be kept below an adiabaticity criterion of the multi-clad optical fiber 106. In this way, the lengths L of the taper portions 114 and 116 can be reduced (e.g., compared to lengths L' of taper portions of the optical fiber device of FIG. 1) without sacrificing the adiabaticity of the resulting double-clad optical fiber device 100.

In this example, only the inner and outer claddings 110 and 112 surround the fiber core 108. However, in some other embodiments, there may be more than two claddings surrounding the fiber core 108. In such embodiments, the resulting optical fiber is generally referred to as a multi-clad optical fiber. It will be noted that although multi-clad optical fibers having a refractive index profile corresponding to two successive steps, in other embodiments, the multi-clad optical fiber can have a refractive index profile varying in a continuous fashion.

In this example, the double-clad optical fiber device 100 has the two taper portions 114 and 116. However, in other embodiments, the double-clad optical fiber device 100 can have only one taper portion, or more than two taper portions.

It is intended that, in this example, the optical signal 102 has power within a spectral band at a given wavelength λ. Accordingly, the fiber core 108 is sized and shaped to be either single-mode or few-mode at at least the given wavelength λ. It will be appreciated that for a specific multi-clad optical fiber device, the wavelength λ is fixed and the adiabatic criterion is calculated based on the wavelength λ and the geometry of the selected multi-clad optical fiber device. Using multi-clad optical fibers to control the shape of the adiabatic criterion is not exclusive to one wavelength. Therefore, the exposed principle can be applied to other optical fiber devices, operating at different wavelengths.

In the illustrated embodiments, the fiber core 108 has a first refractive index n1, the inner cladding 110 has a second refractive index n2 lower than the first refractive index n1, and the outer cladding 112 has a third refractive index n3 lower than the second refractive index n2.

Depending on the embodiment, the normalized slope of at least one of the taper portions 114 and 116 can be at least two times the adiabaticity criterion of the conventional single-clad optical fiber. In some other embodiments, the normalized slope of at least one of the taper portions 114 and 116 is at least ten times the adiabaticity criterion of a conventional single-clad optical fiber. In further embodiments, the normalized slope of at least one of the taper portions 114 and 116 is at least forty times the adiabaticity criterion of a conventional single-clad optical fiber.

In some embodiments, the multi-clad optical fiber device 100 can have a total length below 20 mm, preferably below 10 mm, most preferably below 5 mm. In some other embodiments, the multi-clad optical fiber device 100 can have a total length being two times smaller than a corresponding single-clad optical fiber device having a single-clad optical fiber instead of the multi-clad optical fiber 106, preferably ten times smaller than the corresponding single-clad optical fiber device, most preferably forty times smaller than the corresponding single-clad optical fiber device.

Figure 4:
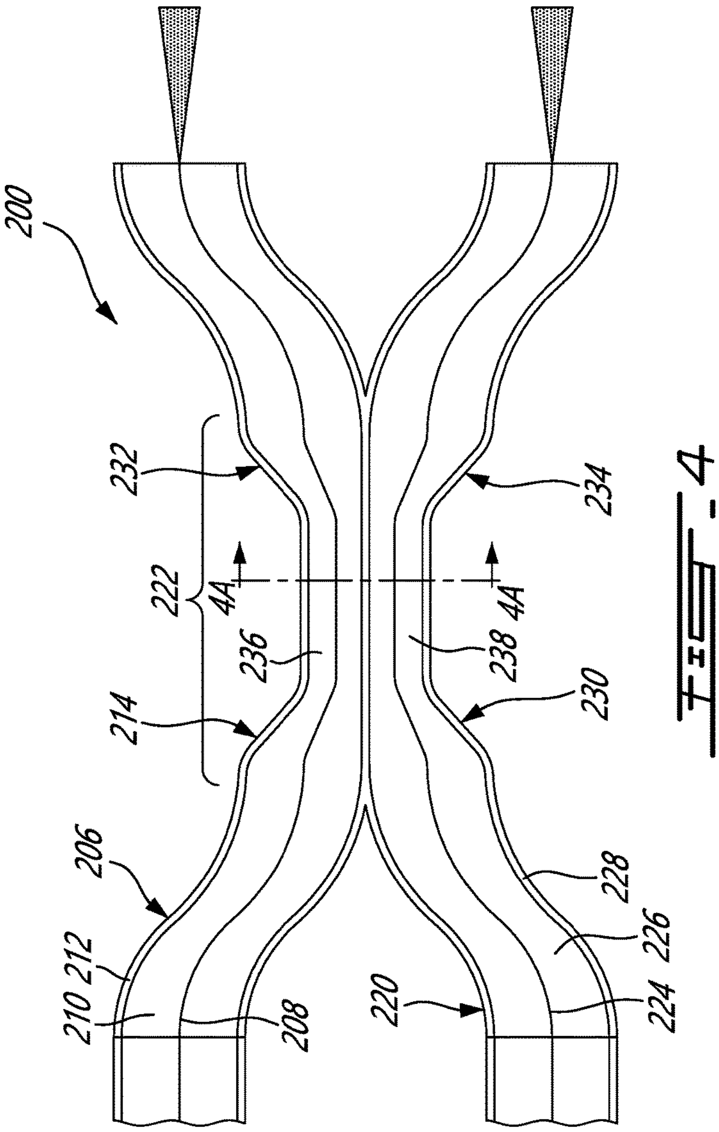
FIG. 4 is a schematic view of an example of an optical fiber device having a multi-clad optical fiber with a taper portion being optically coupled to a portion of a multi-clad second optical fiber, in accordance with an embodiment.

FIG. 4 shows an example of a multi-clad optical fiber device 200, in accordance with an embodiment. As depicted, the multi-clad optical fiber device 200 has a first multi-clad optical fiber 206, a second optical fiber 220 and a coupling region 222.

The first multi-clad optical fiber 206 has a first fiber core 208, a first inner cladding 210 surrounding the first fiber core 208, and at least a first outer cladding 212 surrounding the first inner cladding 210. As illustrated, the first multi-clad optical fiber 206 has a first taper portion 214 extending along a longitudinal dimension z. The first taper portion 214 has a radial dimension ρ progressively decreasing at a first normalized slope exceeding a first adiabaticity criterion of a first conventional single-clad optical fiber propagating at least the single-mode across its single-mode core.

As shown, the coupling region 222 has at least a portion of the first taper portion 214 of the first multi-clad optical fiber 206 optically coupled to at least a portion of the second optical fiber 220. In this example, the optical coupling is achieved by thermally fusing the first taper portion 214 of the first multi-clad optical fiber 206 to the second optical fiber 220. In some other embodiments, the optical coupling can be achieved by contacting the first taper portion 214 of the first multi-clad optical fiber 206 to the second optical fiber 220.

In this specific example, the second optical fiber 220 is provided in the form of a second multi-clad optical fiber 220. As shown, the second multi-clad optical fiber 220 has a second fiber core 224, a second inner cladding 226 surrounding the second fiber core 224, and at least a second outer cladding 228 surrounding the second inner cladding 226. The second multi-clad optical fiber 220 has at least a second taper portion 230 extending along a longitudinal dimension z, the second taper portion 230 has a radial dimension ρ progressively decreasing at a second normalized slope exceeding a second adiabaticity criterion of a second conventional single-clad optical fiber propagating at least the single-mode across its single-mode core.

Figure 4A:
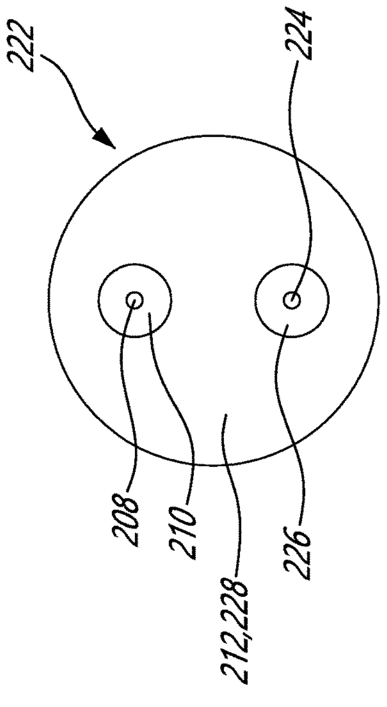
FIG. 4A is a sectional view of a coupling region of the optical fiber device of FIG. 4, taken along section 4A-4A of FIG. 4.

In this embodiment, the coupling region 222 has the at least a portion of the first taper portion 214 optically coupled to at least a portion of the second taper portion 230, a section of which is shown in FIG. 4A.

As illustrated, the first and second normalized slopes are similar to one another in this embodiment. However, in other embodiments, the first and second normalized slopes can be different from one another.

Referring back to FIG. 4, the first fiber core 208 has a first refractive index n1 and a first radial dimension ρ1, the first inner cladding 210 has a second refractive index n2 and a second radial dimension ρ2, and the first outer cladding 212 has a third refractive index n3 and a third radial dimension ρ1, with n1>n2>n3 and ρ1<ρ2<ρ3. The second fiber core 224 has a fourth refractive index n4 and a fourth radial dimension ρ4, the second inner cladding 226 has a fifth refractive index n5 and a fifth radial dimension ρ5, and the second outer cladding 228 has a sixth refractive index n6 and a sixth radial dimension ρ6, with n4>n5>n6 and ρ4<ρ5<ρ6.

In this example, the second multi-clad optical fiber 220 has a geometry and composition that is similar to a geometry and composition of the first multi-clad optical fiber 206. In such embodiments, the multi-clad optical fiber device 200 is said to be symmetric. Accordingly, the first and fourth refractive indexes n1 and n4 are similar to one another, the second and fifth refractive indexes n2 and n5 are similar to one another, the third and sixth refractive indexes n3 and n6 are similar to one another, the first and fourth radial dimensions ρ1 and ρ4 are similar to one another, the second and fifth radial dimensions ρ2 and ρ5 are similar to one another and the third and sixth radial dimensions ρ3 and ρ6 are similar to one another.

In the illustrated embodiment, the first multi-clad optical fiber 206 has a third taper portion 232 being longitudinally spaced-apart from the first taper portion 214. As shown, the third taper portion 232 has a radial dimension ρ progressively increasing at a third normalized slope exceeding a third adiabaticity criterion of a third conventional single-clad optical fiber propagating at least the single-mode across its single-mode core.

Similarly, the second multi-clad optical fiber 206 has a fourth taper portion 234 being longitudinally spaced-apart from the second taper portion 230. As shown, the fourth taper portion 232 also has a radial dimension ρ progressively increasing at a fourth normalized slope exceeding a fourth adiabaticity criterion of a fourth conventional single-clad optical fiber propagating at least the single-mode across its single-mode core.

In this specific embodiment, the coupling region 222 has the first and second taper portions 214 and 230 being optically coupled to one another and also the third and fourth taper portions 232 and 234 being optically coupled to one another. A middle portion 236 of the first multi-clad optical fiber 206 extending between the first and third taper portions 214 and 232 is also optically coupled to a middle portion 238 of the second multi-clad optical fiber 220 extending between the second and fourth taper portions 230 and 234.

Figure 5:
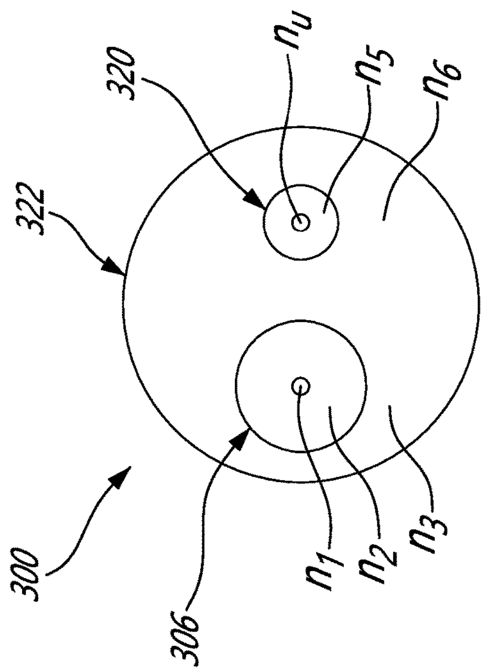
FIG. 5 is a sectional view of a coupling region of a 2×2 asymmetric optical fiber device, incorporating two different multi-clad optical fibers, in accordance with an embodiment.

In other embodiments, multi-clad optical fiber devices can be asymmetric as well. For instance, the second optical fiber can be provided in the form of a second multi-clad optical fiber having a geometry and composition which differs from the geometry and composition of the first multi-clad optical fiber 206. An example of which is shown in FIG. 5. As depicted, in this embodiment, multi-clad optical device 300 has a coupling region 222 having first and second multi-clad optical fibers 306 and 320 being optically coupled to one another, where the first and second multi-clad optical fibers 306 and 320 are different from one another.

In such asymmetric optical fiber devices, the first and fourth refractive indexes n1 and n4 can differ from one another, the second and fifth refractive indexes n2 and n5 can differ from one another, the third and sixth refractive indexes n3 and n6 can differ from one another, the first and fourth radial dimensions ρ1 and ρ4 can differ from one another, the second and fifth radial dimensions ρ2 and ρ5 can differ from one another and the third and sixth radial dimensions ρ3 and ρ6 can differ from one another.

Figure 6:
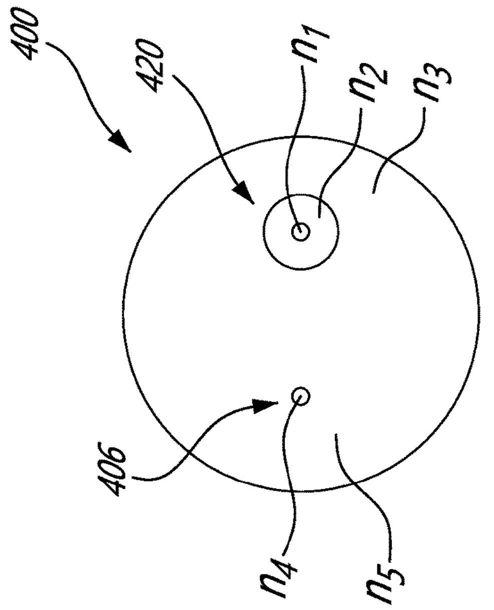
FIG. 6 is a sectional view of a coupling region of a 2×2 asymmetric optical fiber device, incorporating a multi-clad optical fiber device and a single-cladding optical device, in accordance with an embodiment.

Alternately, in some other embodiments, the second optical fiber can be provided in the form of a second single-clad optical fiber, which would still provide an asymmetric optical fiber device, as shown in FIG. 6. In this embodiment, multi-clad optical device 400 has a coupling region 422 having a first multi-clad optical fiber 406 and single-clad optical fiber 320 being optically coupled to one another, where the optical fibers 406 and 420 are also different from one another.

Figure 7:
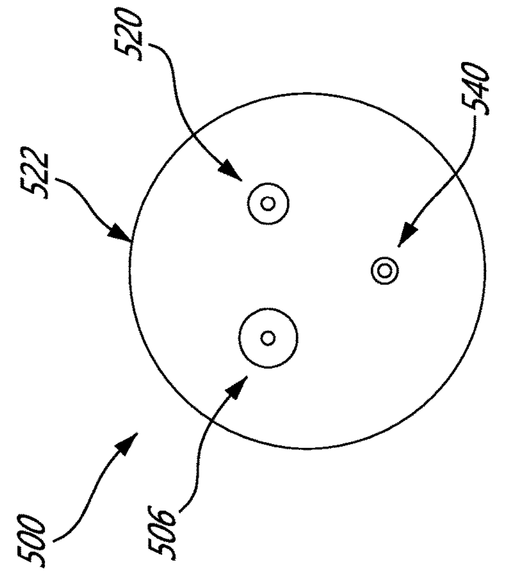
FIG. 7 is a sectional view of a coupling region of a 3×3 asymmetric optical fiber device, incorporating three different multi-clad optical fibers, in accordance with an embodiment.
Figure 8:
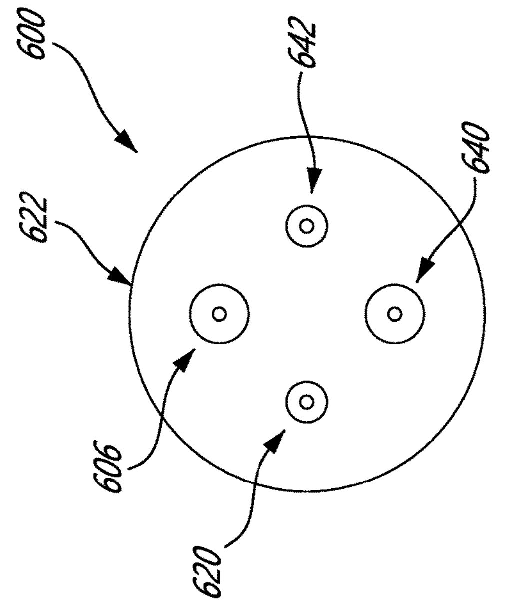
FIG. 8 is a sectional view of a coupling region of a 4×4 optical fiber device, incorporating four multi-clad optical fibers, in accordance with an embodiment.
Figure 6:
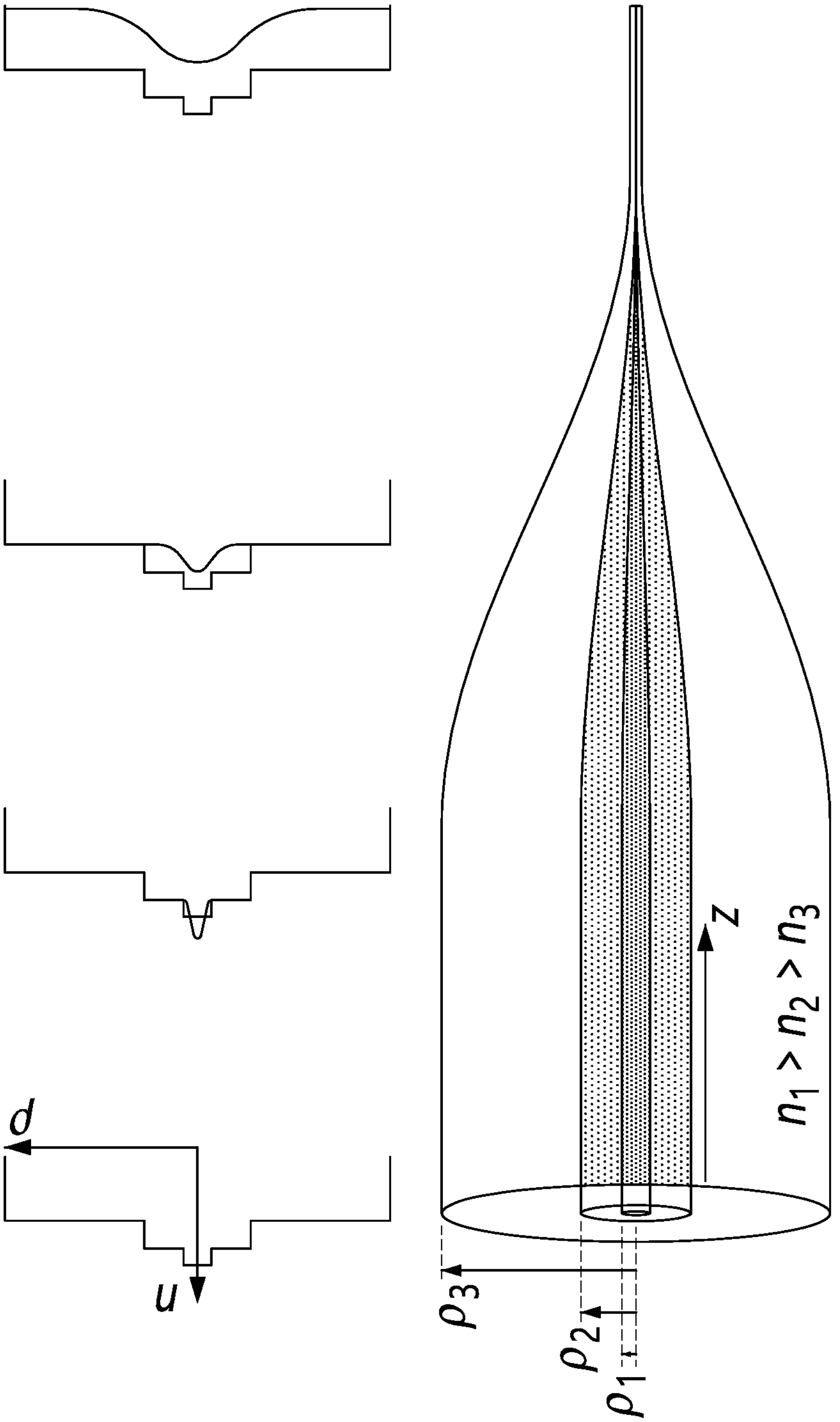

FIGS. 7 and 8 show examples of optical fiber devices 500 and 600 having a multi-clad optical fiber with a taper portion as described herein, one or more other optical fibers, and a coupling region having at least a portion of the first taper portion of the first multi-clad optical fiber, at least a portion of the other optical fibers optically coupled to one another.

More specifically, the optical fiber device 500 has a first, second and third multi-clad optical fibers 506, 520 and 540. Each of the first, second and third multi-clad optical fibers 506, 520 and 540 has a fiber core, an inner cladding surrounding the respective fiber core, and at least an outer cladding surrounding the respective inner cladding. Each of the first, second and third multi-clad optical fibers has at least a taper portion extending along a longitudinal dimension z, with each taper portion having a radial dimension ρ progressively decreasing at a respective normalized slope exceeding a given adiabaticity criterion of a given conventional single-clad optical fiber propagating at least the single-mode across its single-mode core.

In this specific embodiment, the optical fiber device has a coupling region 522 having at least a portion of the taper portion of the first multi-clad optical fiber 506, at least a portion of the taper portion of the multi-clad optical fiber 520 and at least a portion of the taper portion of the third multi-clad optical fiber 540 being optically coupled to one another.

As shown in this embodiment, the optical fiber device 500 is asymmetric, as at least a geometry of the first, second and third multi-clad optical fiber 506, 520 and 540 differ from one another. However, in some other embodiments, the geometry of the first, second, and third multi-clad optical fibers is similar to one another, thus providing a symmetric optical fiber device.

More specifically, the optical fiber device 600 has a first, second, third and fourth multi-clad optical fibers 606, 620, 640 and 642. Each of the first, second, third and fourth multi-clad optical fibers 606, 620, 640 and 642 has a fiber core, an inner cladding surrounding the respective fiber core, and at least an outer cladding surrounding the respective inner cladding. Each of the first, second, third and fourth multi-clad optical fibers 606, 620, 640 and 642 has at least a taper portion extending along a longitudinal dimension z, with each taper portion having a radial dimension ρ progressively decreasing at a respective normalized slope exceeding a given adiabaticity criterion of a given conventional single-clad optical fiber propagating at least the single-mode across its single-mode core.

In this specific embodiment, the optical fiber device 600 has a coupling region 622 having at least a portion of the taper portion of the first multi-clad optical fiber 606, at least a portion of the taper portion of the multi-clad optical fiber 620, at least a portion of the taper portion of the third multi-clad optical fiber 640 and at least a portion of the taper portion of the fourth multi-clad optical fiber 642 being optically coupled to one another.

As shown in this embodiment, the first and third multi-clad optical fibers 606 and 640 share at least a common geometry whereas the second and fourth multi-clad optical fibers 620 and 642 share at least another geometry.

As can be understood from the several embodiments described above, it is within the ambit of the present disclosure to encompass any optical fiber device which has at least one multi-clad optical fiber device with a taper portion such as those described herein which is coupled to at least another optical fiber. For instance, although FIG. 4 shows an example of a 2×2 symmetric optical fiber coupler, FIGS. 5 and 6 shows examples of 2×2 asymmetric optical fiber couplers, FIG. 7 shows an example of a 3×3 asymmetric optical fiber coupler and FIG. 8 shows an example of a 4×4 optical fiber coupler (being symmetric with respect to a given radial orientation, but asymmetric with respect to another radial orientation orthogonal to the given radial orientation, it is intended that the optical fiber device could be provided in the form of N×N symmetric or asymmetric optical fibers device, where N is an integer ranging from 1 to N.

EXAMPLE 1

Ultra Short Adiabatic Optical Fiber Devices

In this example, a method to produce ultrashort adiabatic fibered components is presented. It was found that by using properly parametrized double-(or multi-) clad fiber it is possible to ease the adiabatic (lossless) transition of scalar modes from core modes to cladding modes. This process allows to dramatically shorten adiabatic fibre devices. A review of the adiabatic transition is made regarding the step index single-mode fiber SMF-28 from Corning. The proposed concept is then tested with double clad fibers (fibers A and B), both with cores that are single mode at wavelengths above 630 nm. Adiabaticity curves are calculated for the fundamental mode at 730 nm for a taper and compare with experimental results for a $L_0$=1 mm tapering. The resulting component is at least 4.25 times shorter than its usual step index counterpart and, according to our simulations, could be made easily 42.5 times shorter. Using the same fibers, ultrashort symmetrical (WDM) couplers and asymmetrical (null) couplers of total length 8 mm (including the transition zone) are manufactured. The possibility of applying the method to higher-order spatial modes is also discussed. A method of fabrication for spatial mode multiplexers using this approach is also proposed. The suggested method can shorten the length of simple 1 and 2 fibers components, but could also greatly simplify the fabrication of many-(more than two-) fiber components. Finally, potential applications in few-modes telecommunications and microscopy applications are briefly discussed.

Fused-tapered optical fiber devices are characterized in their cross-section by a fusion parameter F(z) and along their axis by a radius ρ(z), where z is the axial coordinate along the fibers. For example, a bare standard optical fiber has a radius ρ(z)=62.5 μm. A tapered fiber is completely characterized by the ρ(z) function describing its radius for each position.

Diameter variations may induce coupling among the fiber modes. This can be either coupling among guided modes or coupling to higher-order unguided modes, thereby inducing propagation loss. A device is said to be adiabatic if the diameter variations induce no or negligible coupling for a given input mode. Adiabaticity is obtained when the transitions are smooth, equivalently when the derivative dρ/dz is sufficiently small. The adiabatic limit can be quantitatively characterized by the inequality $$\frac{1}{\rho}\frac{d\rho}{dz} \ll \frac{\Delta\beta_{ij}}{\underline{C_{ij}}} \tag{1}$$

where $\Delta_{ij}=\beta_i-\beta_j$ is the difference between the propagation constant for two modes i and j, and $\underline{C_{ij}}$ is the normalized coupling coefficient. The left-hand side is the normalized slope of a device and the right-hand side the adiabaticity criterion.

The core mode of a single-mode double-(or multi-)clad fiber is populated by light. A core mode is defined by its effective index, $n_2<n_{eff}<n_1$. As the fiber gets tapered the mode slowly transit to a first cladding mode. It leaks more and more into the first cladding until $n_3<n_{eff}<n_2$. The taper continues to shrink and a second transition from the first cladding mode to glass cladding mode occurs. A n-layer fiber is characterized by the radius ($\rho_1, \rho_2, \ldots, \rho_n$) and indexes ($n_1, n_2, \ldots, n_n$) of its n layers.

We found that the intermediate layer (i.e. the first cladding) of a double clad fiber could facilitate the transition of the core mode by raising the adiabatic criterion (see for example FIGS. 10A-D). This property is easily demonstrable in waveguides with cylindrical geometry, but was also shown experimentally to extend symmetrical and asymmetrical two fiber components.

As shown below properly parametrized double clad fibers and lead to very short all-fibered component which would be impossible to make with single step index fibers. Single-mode double clad fibers are the simplest case where this technique is useful but, as shown below, it is not restricted to the first linearly polarized mode. Also we think that the adiabatic properties will generalize to more complex index structures such as multilayer step index, continuous index with similar geometry and multi-core fibers. Those structures will be explored in future work.

As shown below, by choosing the proper set of parameters ($\rho_1, \rho_2, \ldots, \rho_n$) and indexes ($n_1, n_2, \ldots, n_n$) it is possible to control the critical inverse taper ratio (ITR) at which modes are transiting to the glass cladding as well has their adiabatic criterion and their mode field diameter (MDF). This technique could easily be used to build components compatible with existing infrastructures such as the existing fiber optic network.

FIG. 10A shows the adiabatic curve for a tapered SMF-28 optical fibre. The bottom axis is the inverse taper ratio (ITR) defined as $$ITR = \frac{\rho}{\rho_0} \tag{2}$$

where $\rho_0$ is the radius before tapering, hence 62.5 μm. The left axis is the adiabaticity criterion of Eq. 1. An SMF-28 tapered fiber is adiabatic as long as the normalized slope does not exceed approximately 0.35 $mm^{-1}$. For comparison, FIGS. 10B and 10C show the adiabatic curves for putative optical fibers containing an inner cladding with a V parameter of 2 and 4 respectively and with the same core radius and normalized frequency ($V_1$=2) has the SMF-28's core. FIG. 10D shows a summary of the important properties of each condition. $ITR_c$ are the approximate ITR for which the $LP_{01}$ mode transits from the core to the first cladding ($ITR_{c_1}$) and for first cladding to glass cladding ($ITR_{c_2}$). The column Min exposes the minimum of the adiabatic criterion curve, which is the hardest point to satisfy in a recipe.

In FIG. 10A we see for a usual 1 step index single-mode fiber that doubling the core's size only leads to and increase the adiabatic criterion of about 1.4 times. This fiber would be impractical has its Δn=0.0013 is very low and its MFD wouldn't match standard SM fiber.

In FIG. 10B, we see that 2 steps fibers with $V_2$=2 already shows a significant improvement over its standard SMF-28 counterpart. Again the transition glass cladding seems to be facilitated by a larger radius. In general a larger guiding structure to glass cladding ratio gives more adiabatic transition. This was already known for single step fiber but was never investigated in multi-transition devices as we do here.

In the best case presented here modifying SMF-28's index profile results in an eightfold increase on the adiabaticity criterion. For the 2 steps, $V_2$=4 and $\rho_2$=20 μm, the minimum of the adiabatic criterion has increased from 0.35 $mm^{-1}$ to 2.88 $mm^{-1}$, a factor 8.2. This comes with the compromise that the critical ITR at which the $LP_{01}$ mode makes a transition to the outer cladding has passed from 0.406 to 0.236.

Figure 11:
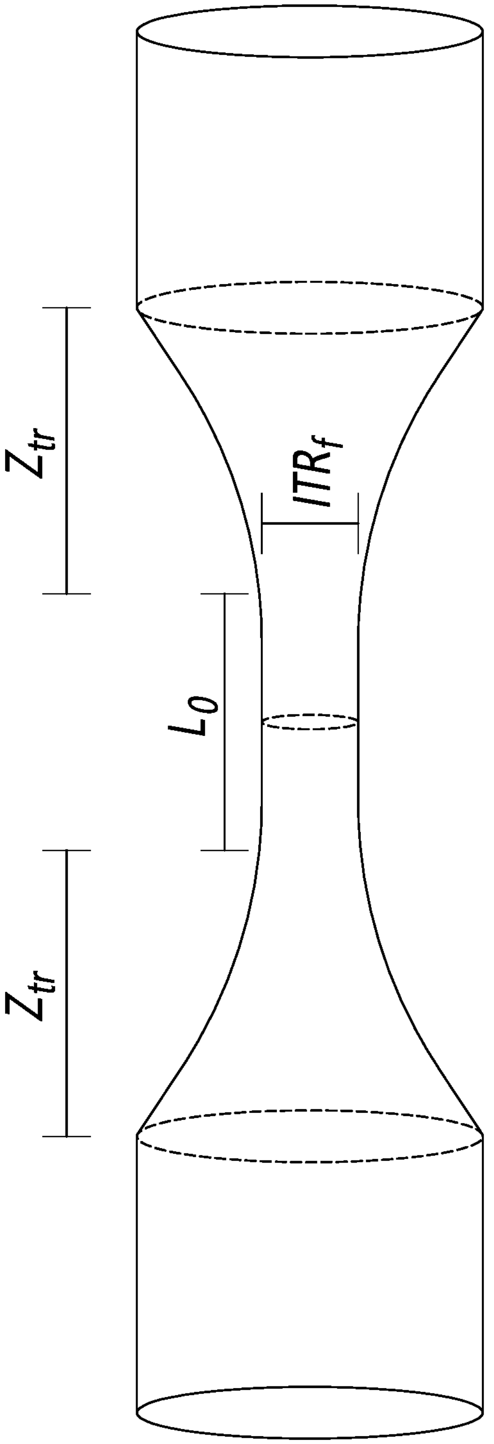
FIG. 11 is a schematic view showing an optical fiber device, showing a constant heat zone $L_0$, in accordance with an embodiment.
Figure 12A:
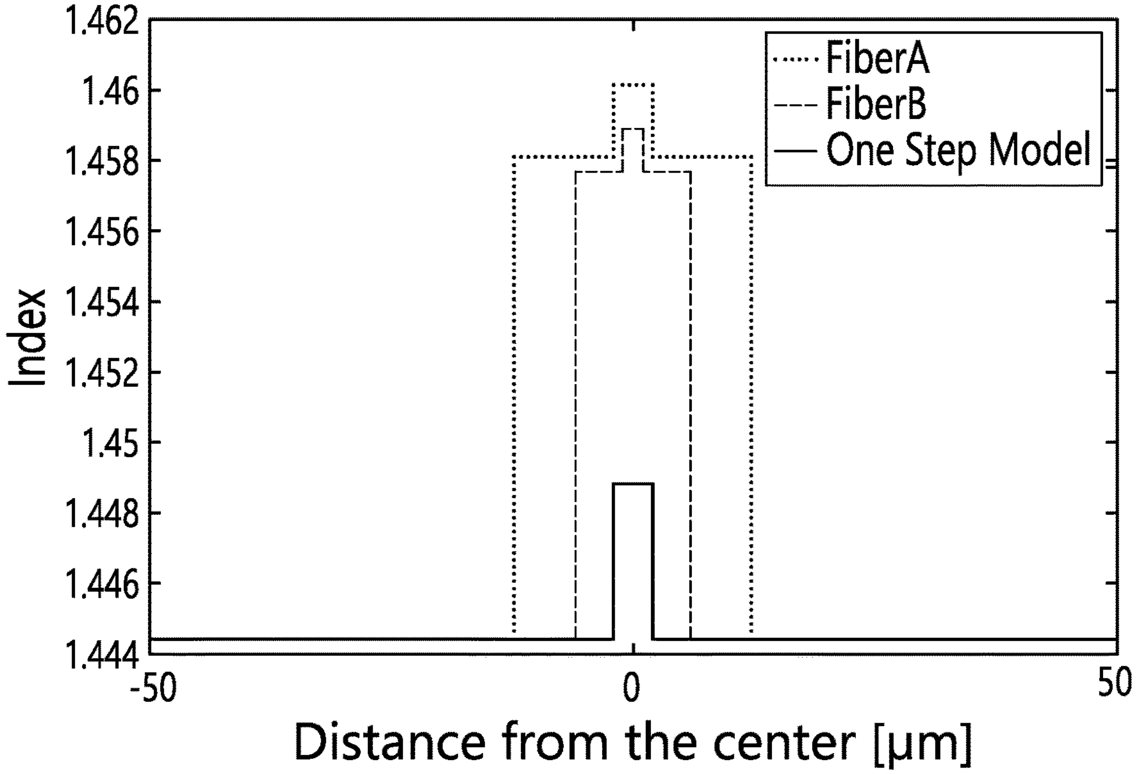
FIGS. 12A and 12B are graphs showing refractive index profiles as function of radial dimension ρ for multi-clad optical fibers A and B, in accordance with some embodiments.
Figure 12B:
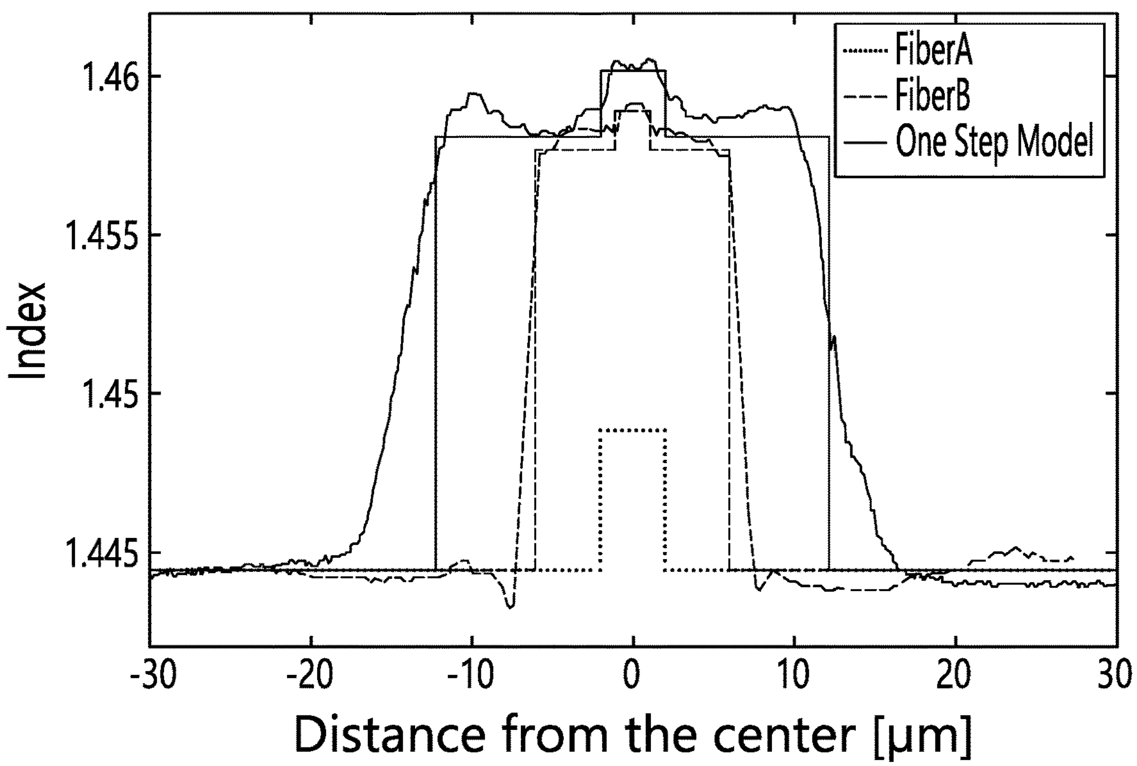

A constant heat zone stretched component is the simplest form of taper achievable in the lab and gives a good estimate of the shortest component achievable adiabatically. A zone of length $L_0$ is heated with a propane flame and two motors pull symmetrically on each end of the component producing a tapered form (FIG. 11). The length of the tapered transition ($z_{tr}$) in a constant heat zone stretched component is $z_{tr}$=ln ($ITR_f$)*−$L_0$ and the total length of the component is $L_{tot}=2z_{tr}+L_0=(-2\ln(ITR_f)+1)*L_0$ This means that increasing the adiabatic criterion by 8 times makes a component roughly 8 times shorter if we consider they have the same $ITR_f$.

In general we have observed that having a mode more strongly guided (i.e. greater difference of index in comparison with the glass cladding) would increase the adiabatic criterion even with a single core (which would inevitably become multimode). The advantage of double clad fiber is that by choosing the right V parameter and radius of the core, it can still be single-mode and made to match the mode diameter of a standard fiber.

The One step model was build such that is has the same radius and normalized frequency as the core of fiber A. Fiber A and B where already available in the lab and where therefore chosen for the demonstration principle. Each core are single-mode at 630 nm and above.

To study the adiabatic transition for the $LP_{01}$ mode in fiber A and B, the scalar field equation was solved using our own inhouse software. In this case, only the radial part of the scalar equation need to be solved since we are working in a cylindrically symmetrical wave guide. The effective index and the coupling coefficient were calculated for the first 5 modes with of the $LP_{0n}$ family since the coupling coefficient is null other families because of the cylindrical symmetry.

Figure 13A:
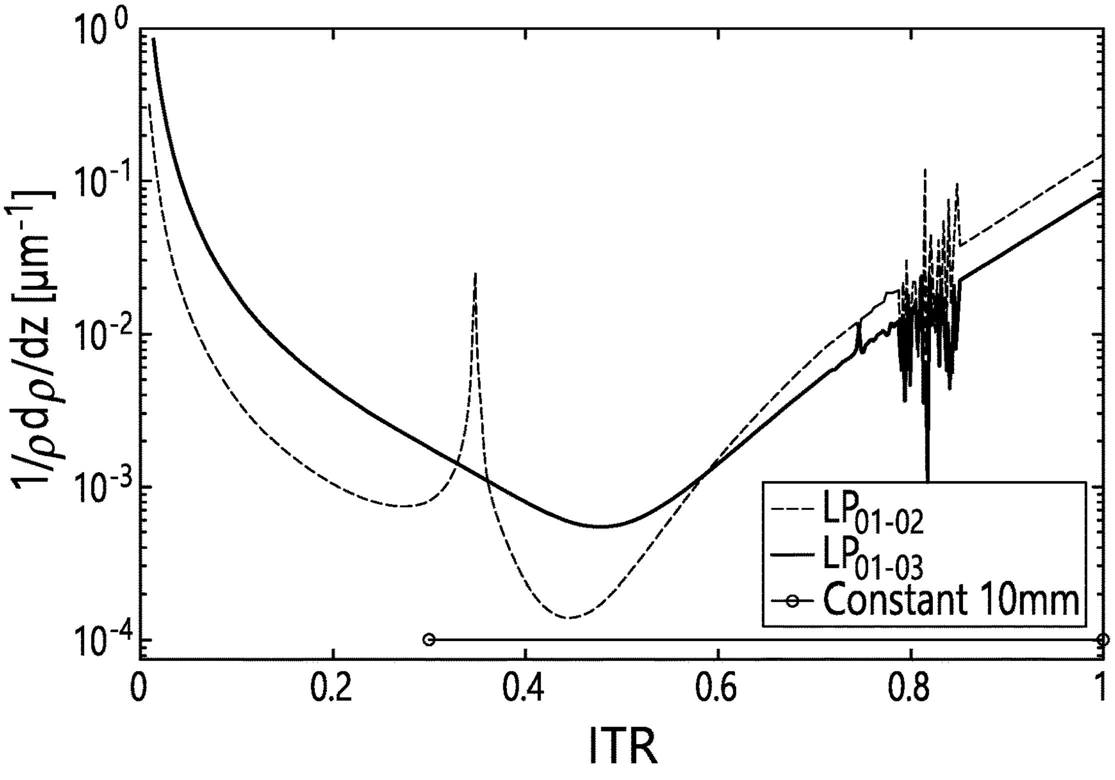
FIG. 13A is a graph showing normalized slope as function of ITR showing adiabaticity criterion curve for an example of a conventional single-clad optical fiber propagating the fundamental mode and other few other modes.
Figure 13B:
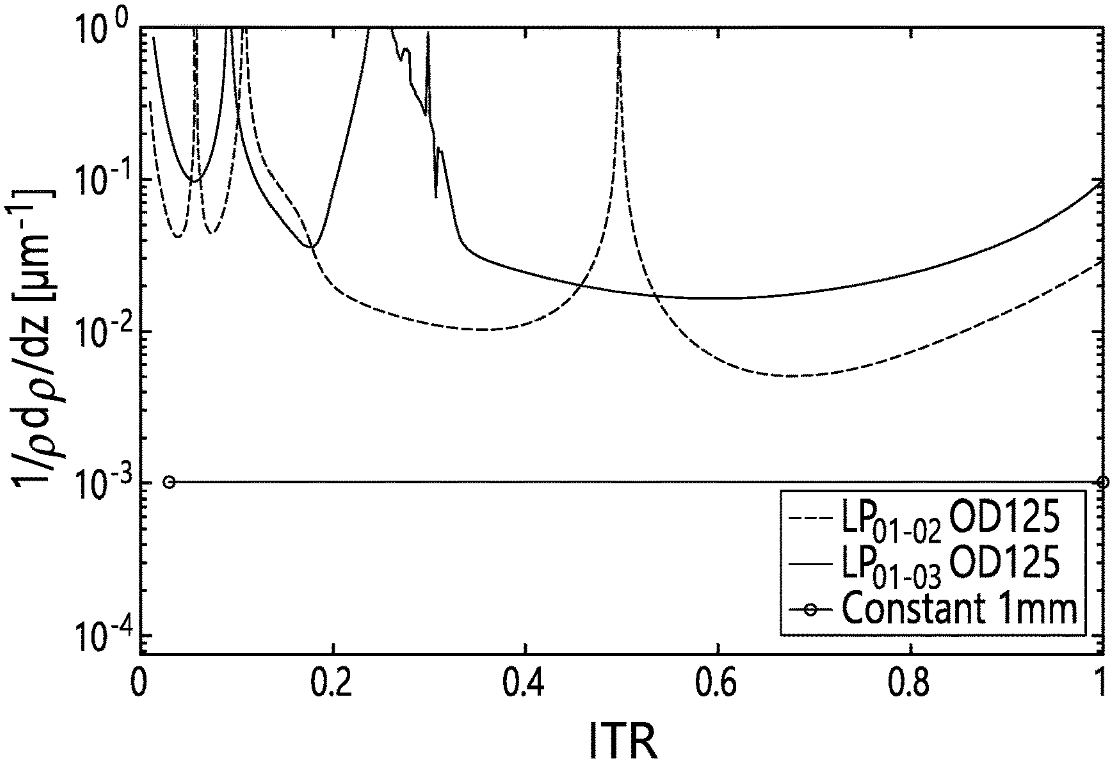
FIG. 13B is a graph showing normalized slope as function of ITR showing adiabaticity criterion curve for an example of a multi-clad optical fiber propagating the same modes as in the conventional single-clad optical fiber of FIG. 13A, in accordance with an embodiment.

On FIGS. 13A and 13B fiber A is compared with a step index fiber of the same V parameter for the core. As shown in FIGS. 13A and 13B, adiabatic criterion is drawn only for the first 3 modes of the $LP_{0n}$ family.

$LP_{0i\text{-}0j}$ lines are lines which respects $$\frac{1}{\rho}\frac{d\rho}{dz} = \frac{\Delta\beta_{ij}}{\underline{C_{ij}}}.$$

it a tapering recipe is sufficiently under the line for all point in the recipe then the transformation process (in this case for $LP_{01}$) is adiabatic. The x-axis it the ITR which is simply the inverse of the reduction rate and is define by ITR=$\rho/\rho_0$. A recipe always starts with ITR=1 and is finishing with a smaller ITR. The y-axis is the normalized slope and has units in inverse of length. Horizontal line represent constant length hot zone during the tapering process and the hot zone $L_0$ is given by the inverse of the y coordinate. Here the yellow line at the bottom represent an adiabatic recipe with $L_0$=10 mm which finishes at ITR=0.3. It barely passes under the $LP_{01\text{-}02}$ adiabatic line for the usual step index fiber. The horizontal purple line represent a recipe with $L_0$=1 mm and $ITR_f$=0.03 which is not adiabatic for the usual step index fiber but is still well below the adiabatic criterion for fiber A. Furthermore, note the core of the usual step index fiber is single-mode at 730 nm. Therefore coupling with $LP_{02}$ or $LP_{03}$ would lead to noticeable loss during the tapering process.

The total length of the taper is simply given by $L_{tot}$=2z+$L_0$, where z is the length of the taper transition and $L_0$ the constant length hot zone. For a constant hot zone recipe we have the following relation analytical relation for the taper transition z=ln($ITR_f$)*−$L_0$ where $ITR_f$ is the ITR of the central zone at which the recipe ends. In table 1 we compare the total length for fiber A and its single step analogue.

In these examples, fibre A has an $ITR_f$ of 0.03, a $L_0$ of 1 mm and a $L_{tot}$ of 8 mm whereas the conventional single-clad optical fiber has an $ITR_f$ of 0.30, a $L_0$ of 10 mm and a $L_{tot}$ of 34 mm.

We see that the adiabatic taper made with fiber A is 4.25 shorter but its final ITR is also 10 times smaller. In fiber A, the transition of the $LP_{01}$ mode from first cladding mode to glass cladding mode occurs around ITR=0.049 which means that even with another choice for the final ITR the factor between the two recipes would still be around 10.

Figure 14:
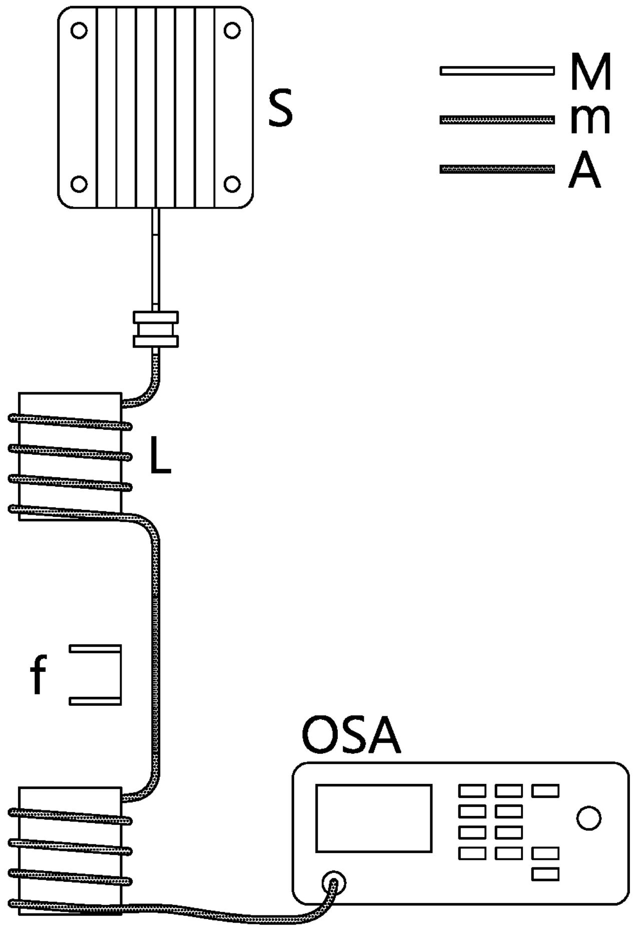
FIG. 14 is a schematic view of an example of an experimental setup for tapering a multi-clad optical fiber, in accordance with an embodiment.

To ensure that only the $LP_{01}$ mode was excited a I-setup was made, as described in FIG. 14. The step includes a broadband light source, spools having diameters of having 3 cm, a tapering flame, an optical spectrum analyzer (OSA), a multi-mode optical fiber, a single-mode optical fiber, and multi-clad optical fiber A A wide band source (Energetiq) is coupled into a multimode fiber which is coupled to a single-mode fiber (Thorlabs 630 HP). The single-mode fiber is rolled (D≈3 [cm]) a few turns around a cylinder. This ensure that every non guided mode (i.e. all modes but $LP_{01}$) are quickly leaking out of the fiber. Another cylinder is used after the taper to ensure that we measure only losses of the $LP_{01}$ mode in the taper. It important to note here that the MDF of the single-mode fiber and Fiber A (and B) are not matched. Therefore the process will always lead to some amount of losses since there will be coupling with higher order modes. By minimizing the beating observed on the spectrum analyzer before tapering it is possible to maximize the coupling toward $LP_{01}$.

We were able to achieve very low losses induce by tapering experimenting with fiber A, which demonstrated that the process is adiabatic for $LP_{01}$.

Figure 15A:
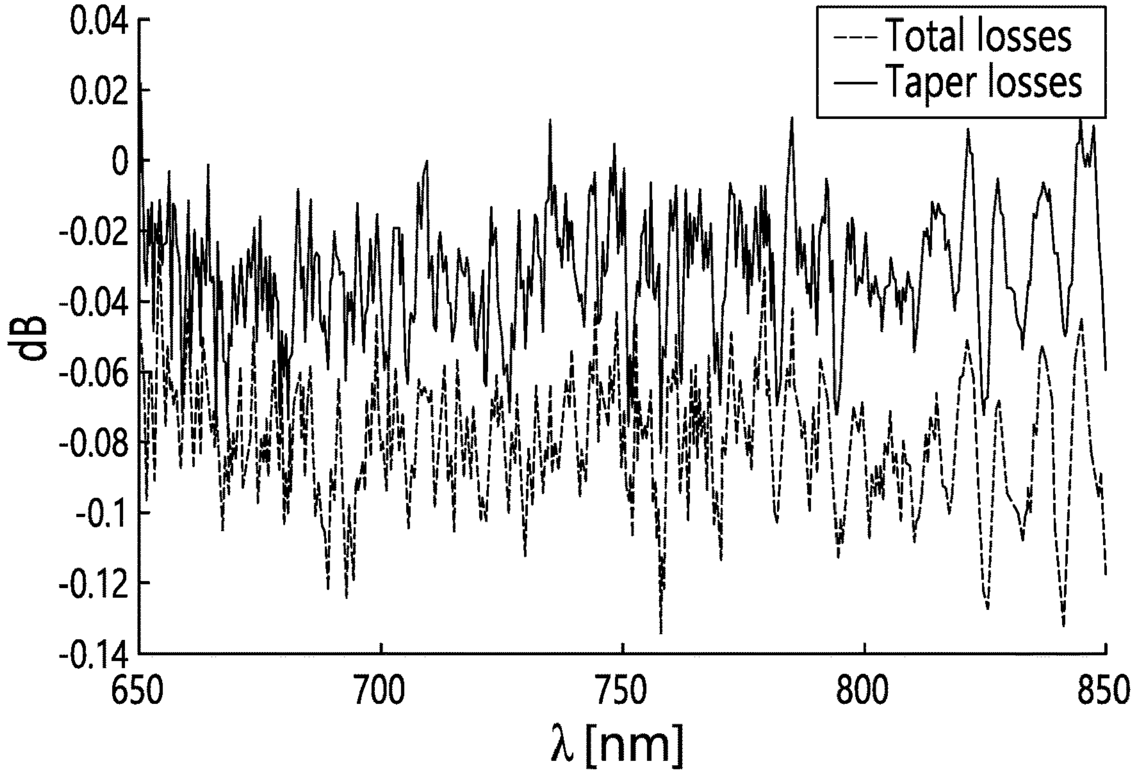
FIGS. 15A and 15B are graphs showing optical losses as function of wavelength of an optical signal propagated into fibers A and B of FIGS. 12A and 13B, respectively, in accordance with an embodiment.
Figure 15B:
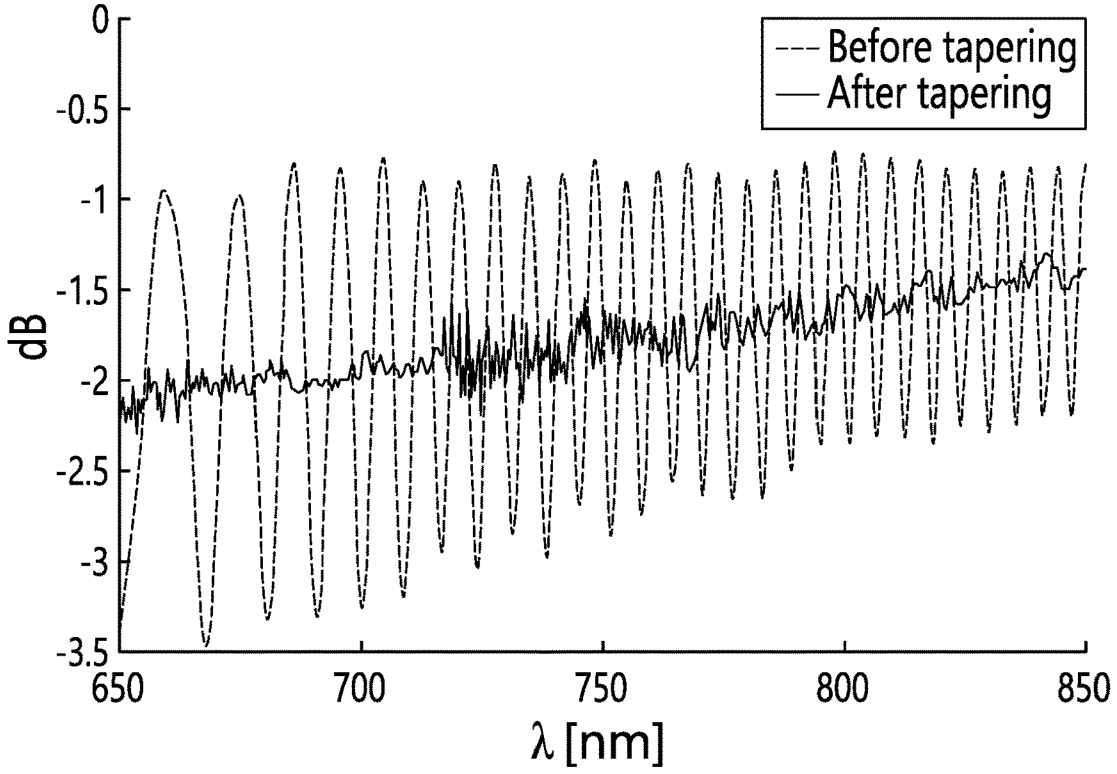

First, a fusion splice between de two single-mode (630 HP) fiber was made and a reference was taken on the spectrum analyzer. The splice was broken and 5 cm of fiber A (or B) was inserted by fusion slicing to the single-mode fibers in order to form what we call a I structure. The transmission spectrum was saved. Fiber A (or B) was then tapered using a constant hot zone length of $L_0$=1 [mm]. On FIGS. 15A and 15B are presented the total losses with respect to the 630 HP-630 HP reference (green line) and losses induced by tapering with respect to the I structure, $L_0$=1 [mm], (red line) for fiber A. Average losses due to tapering are about 0.03 dB and maximum losses are about 0.08 dB. For a usual step index fiber a similar recipe would have induced very high losses.

Results obtained with fiber A and B are bring the question on the possibility to export the principle to directional couplers. In such devices the cylindrical geometry used for our calculation in 5 is inapplicable. Furthermore, 2 fiber components are always harder to be made adiabatically. We proceeded to verify experimentally if the adiabatic properties of fiber A (and B) could be used to produce adiabatic couplers. Simulation for 2×2 symmetric and asymmetric couplers using double clad fiber are still pending.

Figure 16:
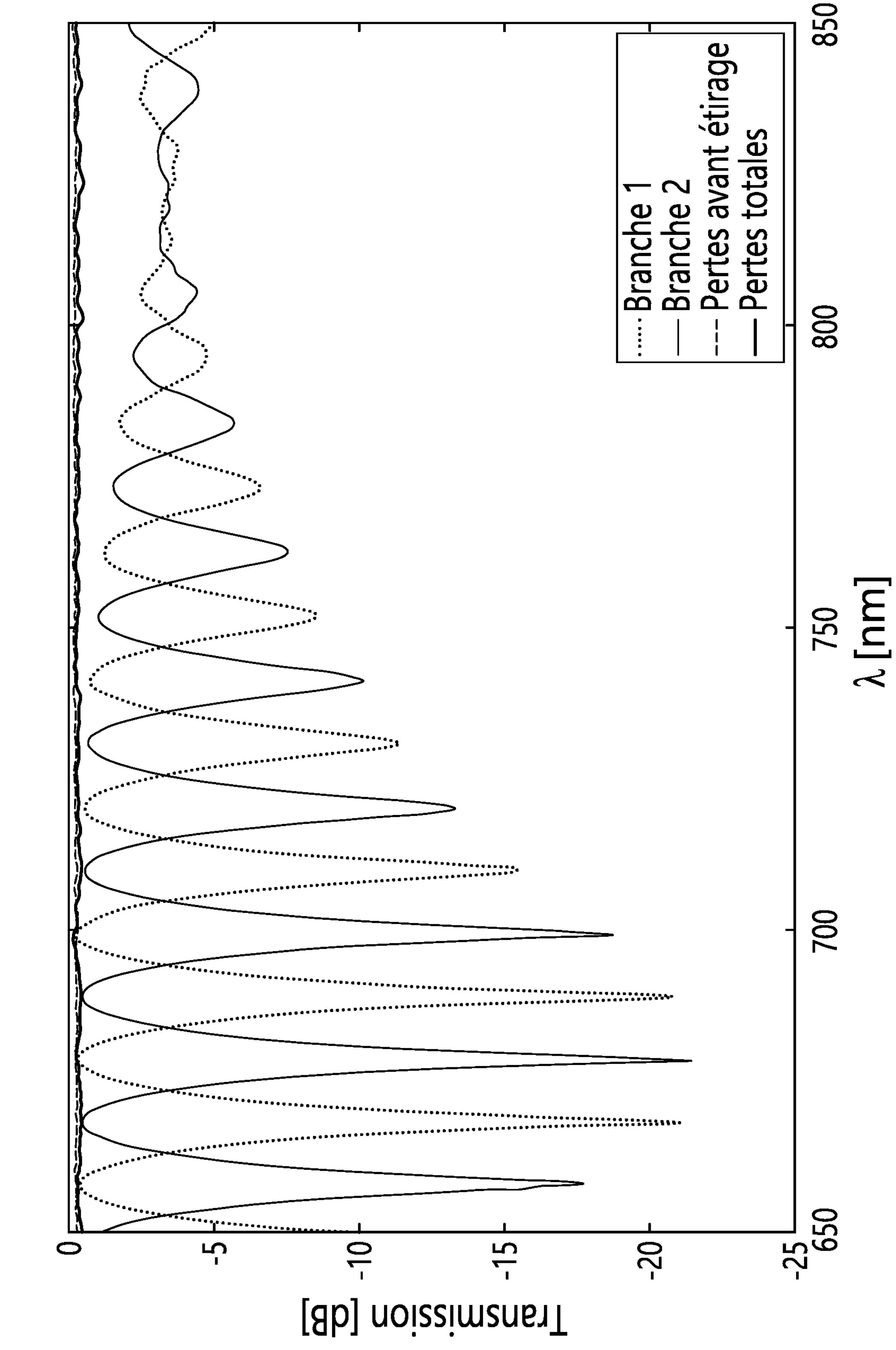
FIG. 16 is a graph showing transmission as function of wavelength of an optical signal propagated across different portions of a 2×2 symmetric adiabatic optical fiber coupler, in accordance with an embodiment.

FIG. 16 shows a wavelength-division multiplexer (WDM) incorporating two multi-clad optical fibers A. A higher-order mode mix is shown in which polarization modes which dictate the shape of the envelope of the transmission curve. The optical losses due to multi-clad optical fibers A are due to the tapering 0.3 on the observed portion of the WDM.

Repeating such experiment with increasingly shorter multi-clad optical devices shows that the first higher-order mode mixing can occur when ITS is about 0.08 in this example.

Figure 17:
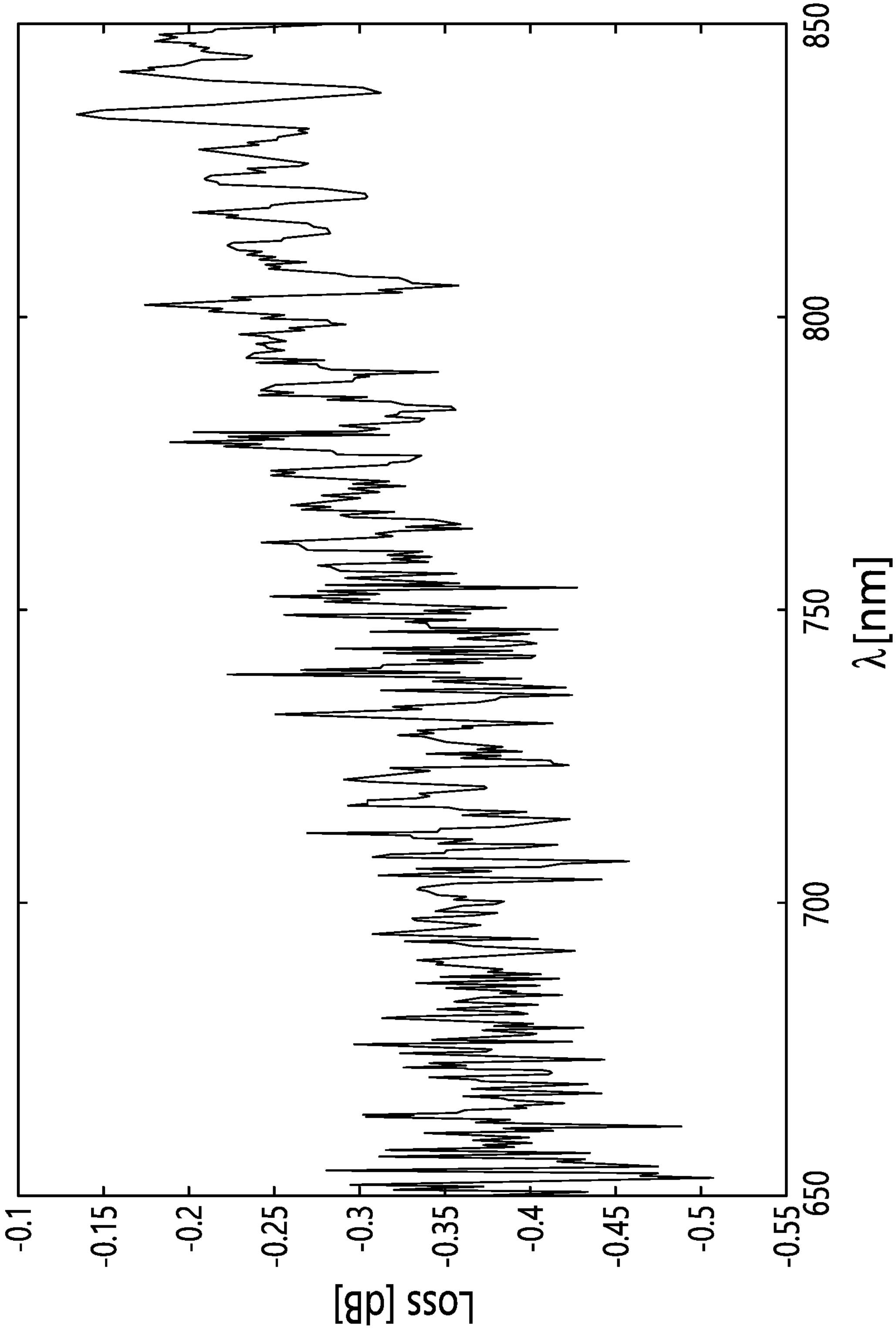
FIG. 17 is a graph showing optical loss as function of wavelength of an optical signal propagated across an ultra-short adiabatic null optical fiber coupler, in accordance with an embodiment.
Figure 18A:
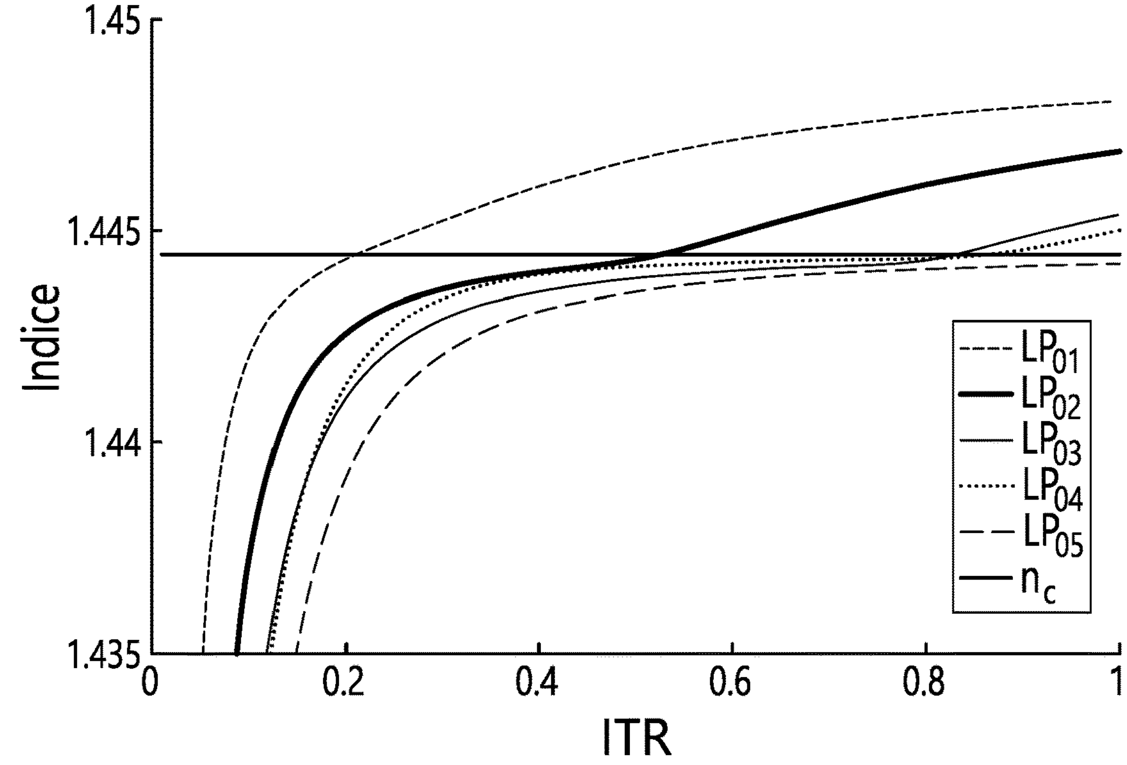
FIG. 18A is a graph showing refractive index profiles as function of ITR for three spatial modes families, calculated with an effective index for the first five modes for a conventional single-clad optical fiber, in accordance with an embodiment.
Figure 18B:
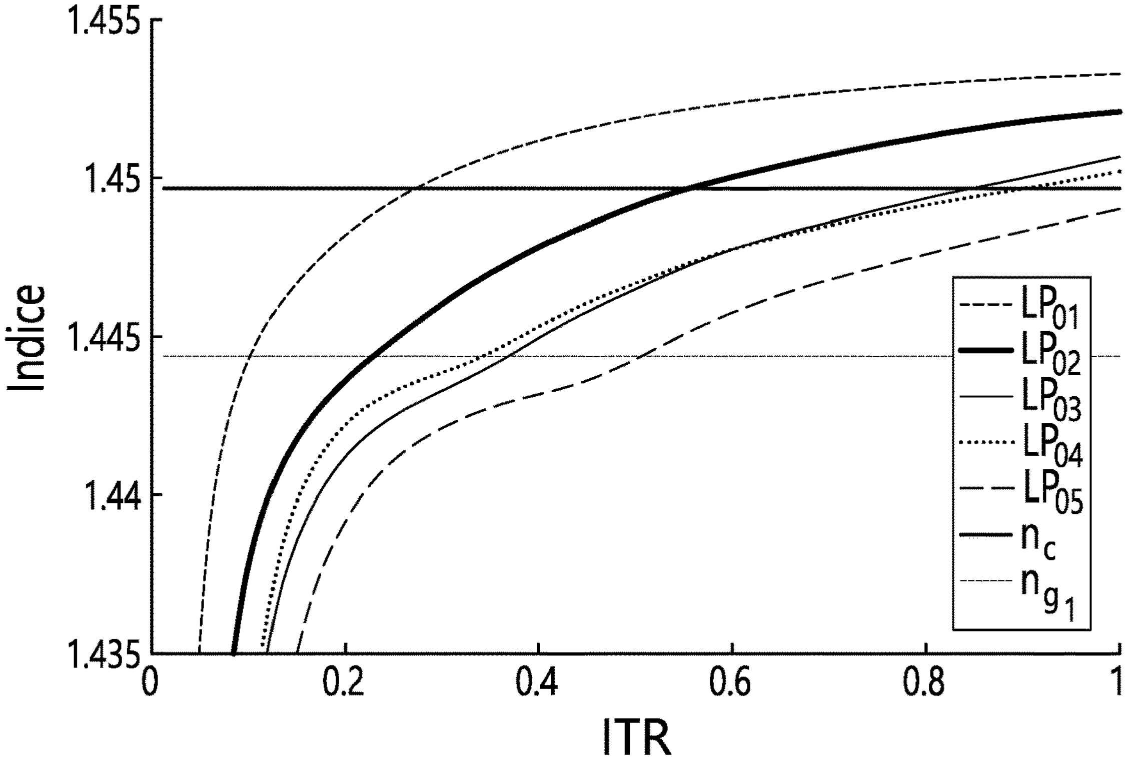
FIG. 18B is a graph showing refractive index profiles as function of ITR for three spatial modes families, calculated with an effective index for the first five modes for a multi-clad optical fiber, in accordance with an embodiment.
Figure 19A:
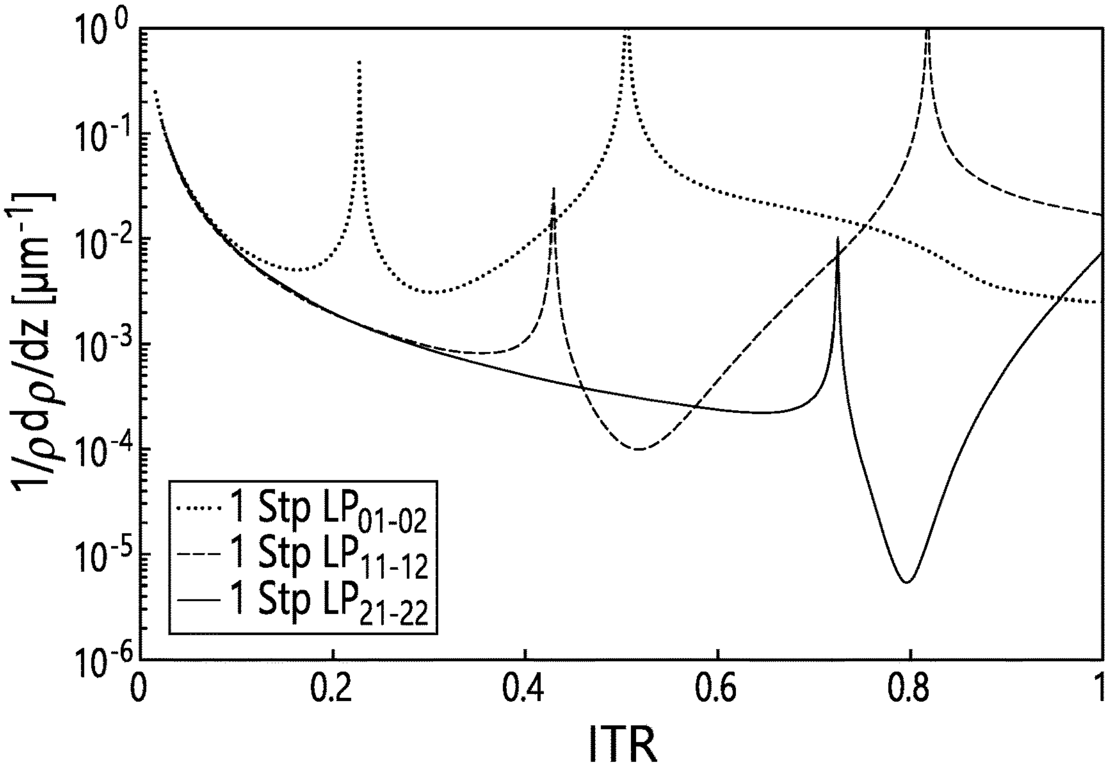
FIG. 19A is a graph showing normalized slope as function of ITR, showing adiabaticity criteria of a single-clad optical fiber propagating an optical signal having few modes.
Figure 19B:
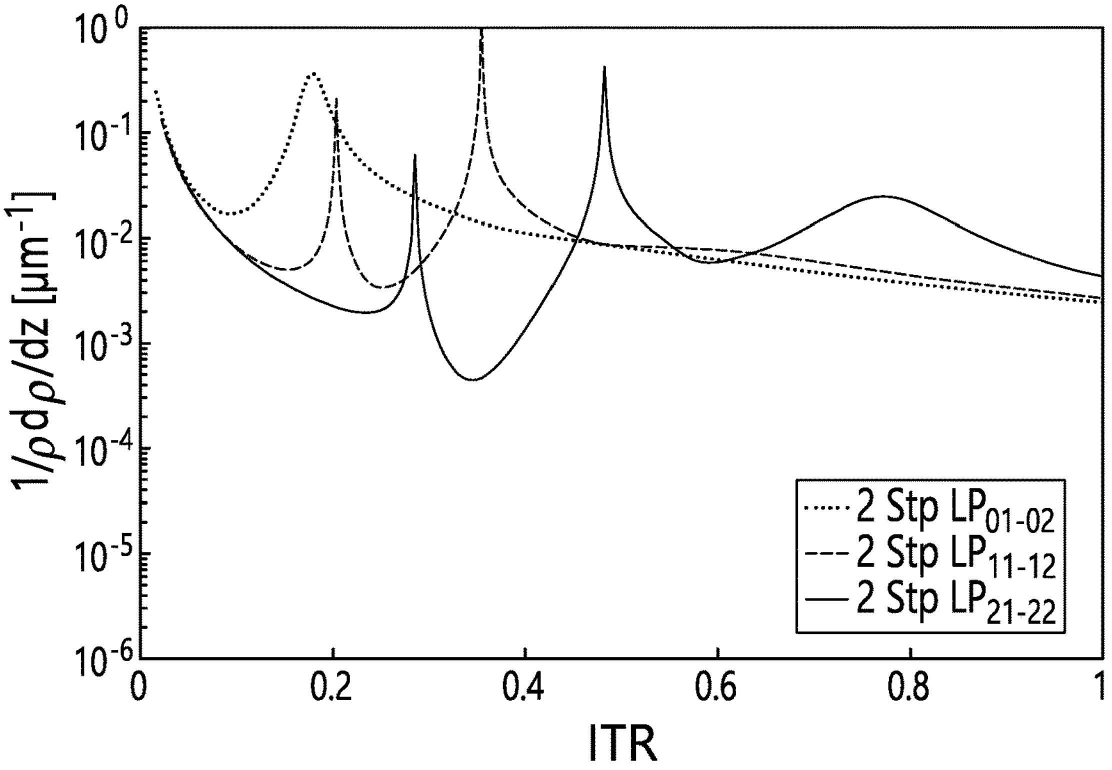
FIG. 19B is a graph showing normalized slope as function of ITR, showing adiabaticity criteria of a multi-clad optical fiber propagating an optical signal having the few modes of FIG. 19A, in accordance with an embodiment.

In FIG. 17, optical losses in one of the arms of a multi-clad optical fiber coupler are shown. No coupling was detectable in the other one of the arms of the multi-clad optical fiber coupler.

To the best of our knowledge, this is the first demonstration that vanishing core structure can be used to decrease the length of all fiber component. We plan on using this method to shorten the length of more complex (more than 2 fibers) component and by doing so facilitating their fabrication and augmenting their fabrication yield.

Adiabatic mode multiplexers exploit a transition between N separated dissimilar single-mode (SM) cores at one end and a solitary multimode (MM) core supporting N spatial modes at the other end Application in multi-core fibers. Reducing the coupling in between core by adding asymmetry (i.e. phase mismatching between neighbor fibers.) Facilitate the fabrication of fanout. Application for phonics lantern (spatial mode multiplexing). Many double clad fiber fibers with single-mode core with mode field diameter matched with SMF-28. Asymmetric cladding (different for each of them) enables adiabatic (easier than ever) transition to other modes. Possibility to build multi-modal near filed microscope.

As can be understood, the examples described above and illustrated are intended to be exemplary only. Although the illustrated multi-clad optical fiber devices are optical fiber couplers, it is intended that other types of devices can incorporate the taper portion such as those described herein. For example, the multi-clad optical fiber device can be an evanescent probe, a photonic lantern and any other suitable device which typically require a single-clad optical fiber for the propagation of a single-mode or few-mode optical signal where the single-clad optical fiber has a taper portion across which the optical signal propagate. For instance, it is intended that an optical fiber device can be provided in the form of N×N symmetric or asymmetric optical fibers device, where N is an integer ranging from 1 to at least 10. Although the multi-clad optical fiber devices are polarization-degenerate, it is intended that non-generate polarization multi-clad optical fiber devices incorporating the taper portions described here can also be provided in alternate embodiments. The scope is indicated by the appended claims.

What is claimed is:

1. A multi-clad optical fiber for propagating an optical signal having at least a single mode, the multi-clad optical fiber comprising a fiber core, an inner cladding surrounding the fiber core, and at least an outer cladding surrounding the inner cladding, the multi-clad optical fiber having at least a taper portion extending along a longitudinal dimension z, the taper portion having a radial dimension progressively decreasing at a normalized slope exceeding an adiabaticity criterion of a conventional single-clad optical fiber propagating at least the single-mode across its single-mode core, the normalized slope of the taper portion of the multi-clad optical fiber being below an adiabaticity criterion of the multi-clad optical fiber propagating at least the single-mode across the fiber core.

2. The multi-clad optical fiber of claim 1 wherein the normalized slope is defined as $$\frac{1}{\rho(z)}\frac{d(\rho(z))}{dz},$$

wherein ρ(z) denotes a radial dimension of the fibre core as function of the longitudinal dimension z, and $$\frac{d()}{dz}$$

denotes a variation or quantity ( ) with respect to the longitudinal dimension z.

3. The multi-clad optical fiber of claim 1 wherein the optical signal has power within a spectral band at a given wavelength λ, the fiber core being one of single-mode and few-mode at the given wavelength λ.

4. The multi-clad optical fiber of claim 1 wherein the fiber core has a first refractive index $n_1$, the inner cladding has a second refractive index $n_2$ lower than the first refractive index $n_1$, and the outer cladding has a third refractive index $n_3$ lower than the second refractive index $n_2$.

5. The multi-clad optical fiber of claim 1 wherein the normalized slope of the taper portion is at least two times the adiabaticity criterion of a conventional single-clad optical fiber.

6. The multi-clad optical fiber of claim 1 wherein the normalized slope of the taper portion is at least ten times the adiabaticity criterion of a conventional single-clad optical fiber.

7. The multi-clad optical fiber of claim 1 wherein the normalized slope of the taper portion is at least forty times the adiabaticity criterion of a conventional single-clad optical fiber.

8. An optical fiber device comprising a first multi-clad optical fiber having a first fiber core, a first inner cladding surrounding the first fiber core, and at least a first outer cladding surrounding the first inner cladding, the first multi-clad optical fiber having at least a first taper portion extending along a longitudinal dimension z, the first taper portion having a radial dimension progressively decreasing at a first normalized slope exceeding a first adiabaticity criterion of a first conventional single-clad optical fiber propagating at least the single-mode across its single-mode core, at least a second optical fiber; and a coupling region having at least a portion of the first taper portion of the first multi-clad optical fiber optically coupled to at least a portion of the second optical fiber, the first normalized slope of the first taper portion of the first multi-clad optical fiber being below an adiabaticity criterion of the first multi-clad optical fiber propagating at least the single-mode across the first fiber core.

9. The optical fiber device of claim 8 wherein the second optical fiber is a second multi-clad optical fiber having a second fiber core, a second inner cladding surrounding the second fiber core, and at least a second outer cladding surrounding the second inner cladding, the second multi-clad optical fiber having at least a second taper portion extending along a longitudinal dimension z, the second taper portion having a radial dimension progressively decreasing at a second normalized slope exceeding a second adiabaticity criterion of a second conventional single-clad optical fiber propagating at least the single-mode across its single-mode core, the coupling region has the at least a portion of the first taper portion optically coupled to at least a portion of the second taper portion.

10. The optical fiber device of claim 9 wherein the first and second normalized slopes are different from one another.

11. The optical fiber device of claim 9 wherein the first and second multi-clad optical fibers are different from one another.

12. The optical fiber device of claim 9 wherein at least the first and second fiber cores differ in at least one of a radial dimension and a refractive index.

13. The optical fiber device of claim 9 wherein at least the first and second inner claddings differ in at least one of a radial dimension and a refractive index.

14. The optical fiber device of claim 9 wherein at least the first and second outer claddings differ in at least one of a radial dimension and a refractive index.

15. The optical fiber device of claim 9 further comprising at least a third optical fiber, the coupling region having the at least the portion of the first taper portion, the at least a portion of the second optical fiber and at least a portion of the third optical fiber optically coupled to one another.

16. The optical fiber device of claim 15 wherein the third optical fiber is a third multi-clad optical fiber having a third fiber core, a third inner cladding surrounding the third fiber core, and at least a third outer cladding surrounding the third inner cladding, the third multi-clad optical fiber having at least a third taper portion extending along a longitudinal dimension z, the third taper portion having a radial dimension progressively decreasing at a third normalized slope exceeding a third adiabaticity criterion of a third conventional single-clad optical fiber propagating at least the single-mode across its single-mode core, the coupling region has the at least a portion of the first taper portion optically coupled to at least a portion of the third taper portion.

17. The optical fiber device of claim 9 further comprising one or more other optical fibers, the coupling region having the at least the portion of the first taper portion, the at least a portion of the second optical fiber and at least a portion of the one or more other optical fibers optically coupled to one another.

18. The optical fiber device of claim 8 wherein the second optical fiber is a single-clad optical fiber.

19. A multi-clad optical fiber for propagating an optical signal having at least a single mode, the multi-clad optical fiber comprising a fiber core, an inner cladding surrounding the fiber core, and at least an outer cladding surrounding the inner cladding, the multi-clad optical fiber having at least a taper portion extending along a longitudinal dimension z, the taper portion having a radial dimension progressively decreasing at a normalized slope exceeding an adiabaticity criterion of a conventional single-clad optical fiber propagating at least the single-mode across its single-mode core, the normalized slope of the taper portion being at least two times the adiabaticity criterion of the conventional single-clad optical fiber.

20. The multi-clad optical fiber of claim 19 wherein the normalized slope of the taper portion is at least ten times the adiabaticity criterion of the conventional single-clad optical fiber.

* * * * *